United States Patent
Cavaliere et al.

(10) Patent No.: US 10,153,840 B2
(45) Date of Patent: Dec. 11, 2018

(54) WIRELESS COMMUNICATION NETWORK APPARATUS AND METHOD OF TRANSMITTING COMMUNICATIONS TRAFFIC IN SIMPLE FORMAT

(71) Applicant: Telefonaktiebolaget LM Ericsson (publ), Stockholm (SE)

(72) Inventors: Fabio Cavaliere, Pisa (IT); Luca Giorgi, Pisa (IT); Filippo Ponzini, Pisa (IT); Elmar Trojer, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/528,393

(22) PCT Filed: Dec. 1, 2014

(86) PCT No.: PCT/EP2014/076134
§ 371 (c)(1),
(2) Date: May 19, 2017

(87) PCT Pub. No.: WO2016/086958
PCT Pub. Date: Jun. 9, 2016

(65) Prior Publication Data
US 2017/0324479 A1    Nov. 9, 2017

(51) Int. Cl.
*H04B 10/2525* (2013.01)
*H04B 10/2575* (2013.01)
*H04W 56/00* (2009.01)

(52) U.S. Cl.
CPC .... *H04B 10/25752* (2013.01); *H04W 56/001* (2013.01)

(58) Field of Classification Search
CPC .............. H04B 10/25752; H04W 56/001
(Continued)

(56) References Cited

U.S. PATENT DOCUMENTS

| | | | |
|---|---|---|---|
| 5,657,374 | A | 8/1997 | Russell et al. |
| 2012/0128040 | A1 | 5/2012 | Kenington |

(Continued)

FOREIGN PATENT DOCUMENTS

| | | |
|---|---|---|
| EP | 2 602 948 | 6/2013 |
| JP | 2014 110574 | 6/2014 |
| WO | WO 2012 054553 | 4/2012 |

OTHER PUBLICATIONS

CPRI Specification v6.0; Interface Specification; Common Public Radio Interface (CPRI); Interface Specification—Aug. 30, 2013.
(Continued)

*Primary Examiner* — Juan A Torres
(74) *Attorney, Agent, or Firm* — Baker Botts, LLP

(57) ABSTRACT

A wireless communications network radio unit (10) comprising: an input (12) arranged to receive a radio over fiber, RoF input optical signal (14) carrying digital radio communications traffic for transmission from a plurality of antenna elements, synchronization traffic and control and management traffic; a digital receiver (16) arranged to receive and terminate the RoF input optical signal to obtain the digital radio communications traffic; a framer (18) arranged to frame the digital radio communications traffic into at least one digital traffic stream consisting of the digital radio communications traffic for transmission from a plurality of the antenna elements and clock recovery information; and at least one optical transmitter (20) arranged to generate an RoF output optical signal (22) carrying the digital traffic stream.

16 Claims, 14 Drawing Sheets

(58) Field of Classification Search
USPC .......................................................... 398/115
See application file for complete search history.

(56) References Cited

U.S. PATENT DOCUMENTS

| | | |
|---|---|---|
| 2012/0250740 A1 | 10/2012 | Ling |
| 2013/0136202 A1* | 5/2013 | Kummetz ............... H04L 25/05 375/267 |
| 2014/0355991 A1* | 12/2014 | Cameirao .......... H04B 10/2575 398/79 |

OTHER PUBLICATIONS

Journal of Lightwave Technology, vol. 28, No. 4; Fiber-Wireless Networks and Subsystem Technologies by Christina Lim et al.—Feb. 15, 2010.
Journal of Lightwave Technology, vol. 29, No. 8; Long-Haul Analog Photonics by Vincent J. Urick—Apr. 15, 2011.
Ericsson Interim Update; Ericsson Mobility Report; On the Pulse of the Networked Society—Feb. 2014.
Ericsson Radio Dot System Commercial Presentation; Commercial in confidence—Mar. 25, 2014.
International Search Report for International application No. PCT/EP2014/076134—Aug. 5, 2015.

\* cited by examiner

WIRELESS COMMUNICATION NETWORK APPARATUS AND METHOD OF TRANSMITTING COMMUNICATIONS TRAFFIC IN SIMPLE FORMAT

PRIORITY

This nonprovisional application is a U.S. National Stage Filing under 35 U.S.C. § 371 of International Patent Application Serial No. PCT/EP2014/076134 filed Dec. 1, 2014, and entitled "Wireless Communication Network Apparatus And Method Of Transmitting Communications Traffic in Simple Format."

TECHNICAL FIELD

The invention relates to a wireless communications network radio unit, an optical extender apparatus and a wireless communications network. The invention further relates to a method of transmitting communications traffic in a wireless communications network and a method of extending the transmission of communications traffic in a wireless communications network.

BACKGROUND

Mobile broadband capacity is growing fast; there is currently 70% growth in data traffic worldwide year on year and most of this growth relates to in-building use. Today's small cell and Distributed Antenna System, DAS, solutions inadequately address the broad range of buildings that mobile communications network operators may want to provide network coverage within, due to a lack of cost effective and well performing solutions that scale well to different building types. With evolving capacity needs, indoor mobile network solutions need to move from current DAS models and distributed femto/pico cells to a heterogeneous small cell model that permits efficient re-use of an operator's macro spectrum inside a building.

Small cell alternatives and active DAS solutions have emerged as contenders in the in-building mobile network space, but have thus far not been strong enough to make any significant impact outside specific use cases. The challenge for small cell products is to meet size, volume and cost targets and that has resulted in products based on System-on-a-Chip platforms (SoC), giving limited performance and functionality compared with the products typically used in a macro network. This has in turn ruled out the use of small cell in performance critical indoor use cases, where regular macro base stations with DAS are being used. The key challenges faced by DAS alternatives are their inability to scale down cost to medium and small size buildings, and that there is no possibility of cost-effectively densifying the indoor cell grid at spectrum capacity exhaustion.

Copper based links set tight constraints on the maximum distance between a radio unit, RU, and a remote radio head, RRH. In medium-large buildings, digital units, DU, and indoor RUs can be centrally co-located, with local area network, LAN, copper cabling connecting the RU to one or more RRH. For large to very large buildings, the DU can be centrally located in the building with indoor RU's distributed at floor level to reduce cabling lengths to the RRH. In situations where a radio base station, RBS, or a micro RBS is already provided on the building roof or nearby, DU baseband resources can be shared, with only the indoor RU's and RRH being installed within the building, effectively leveraging the operator's installed base. This subtending model also enables advanced long term evolution, LTE, coordination between outdoor and indoor network coverage areas. In multi-building campuses or very large venues, a centralized DU can be shared among facilities, while still supporting future expansion. All these scenarios require proximity of RU and RRH to overcome distance limitations imposed by copper links.

The use of optical fibre between RU and RRH, by radio over fibre, RoF, techniques, is one of the best ways to centralize radio functions. RoF can be done in either the analogue or the digital domain. Analogue RoF is able to reduce latency, to be fully agnostic to the carried radio signal and also to simplify RRH complexity, by terminating the digital domain in the RU. Unfortunately, analogue RoF suffers from cumulative effects of noise and device nonlinearities as well as crosstalk arising from impairments in the optical link. In addition, the analogue RoF link performance heavily depends on the current of the photoreceiver used to receive the RoF optical signal, so that the link attenuation that can be tolerated can be very low, limiting the optical power distribution by tree architecture and passive power splitters and also the number of antenna signals which can be carried by a single optical carrier.

Digital RoF can overcome these limitations and the common public radio interface, CPRI, is the reference technology for Digital RoF, as defined in the CPRI Specification v6.0 of 30 Aug. 2013. CPRI data that has to be transferred in the optical domain from a radio base station to an RRH, and vice versa, are transferred in the form of sampled IQ data. A daisy chain of CPRI links can be used to connect a DU to a series of RUs and their connected local RRHs, as illustrated in FIG. 1. Depending on the bandwidth demand of the RU, CPRI can transport several independent IQ data flows. Each IQ data flow reflects the data of one RRH for one carrier, the so-called antenna-carrier, A×C. Although CPRI performs well in macro centralized installations, it is a quite inefficient way to distribute indoor radio channels, characterized by large numbers of small-cells. CPRI requires high bandwidth, dedicated connectivity and a tight synchronization between all the antennas served by a common main digital unit, DU.

SUMMARY

It is an object to provide an improved wireless communications network radio unit. It is a further object to provide an improved optical extender apparatus. It is a further object to provide an improved wireless communications network. It is a further object to provide an improved method of transmitting communications traffic in a wireless communications network. It is a further object to provide an improved method of extending the transmission of communications traffic in a wireless communications network.

A first aspect of the invention provides a wireless communications network radio unit comprising an input, a digital receiver, a framer and at least one optical transmitter. The input is arranged to receive a radio over fibre, RoF, input optical signal. The RoF input optical signal carrying digital radio communications traffic for transmission from a plurality of antenna elements, synchronisation traffic, and control and management traffic. The digital receiver is arranged to receive and terminate the RoF input optical signal to obtain the digital radio communications traffic. The framer is arranged to frame the digital radio communications traffic into at least one digital traffic stream. The at least one digital traffic stream consists of the digital radio communications traffic for transmission from a plurality of the antenna elements and clock recovery information. The at least one optical transmitter is arranged to generate an RoF output optical signal carrying the digital traffic stream.

The radio unit may terminate an incoming digital RoF, DoF, optical signal and convert it into a proprietary digital signal having a simpler format. Besides the digital radio communications traffic for transmission from the antenna elements, the "payload", the digital traffic stream only consists of information to help clock recovery at a receiver. The radio unit may enable the use of DoF but with a simpler format than conventional DoF such as CPRI. This may enable a reduced optical bandwidth to be used compared to full CPRI links. The radio unit may enable an RoF optical signal to generated which requires a minimum intermediate processing between the radio unit and antenna elements. The RoF output optical signal generated by the radio unit may overcome impairments faced analogue RoF, such as cumulative effects of noise and device non-linearities.

In an embodiment, the plurality of antenna elements are arranged in a plurality of antenna groups. The radio unit framer is arranged to frame the digital radio communications traffic into a plurality of digital traffic streams each consisting of the digital radio communications traffic for transmission from the antenna elements of a respective group and the clock recovery information. The radio unit comprises a plurality of optical transmitters each arranged to generate a respective RoF output optical signal carrying a respective digital traffic stream. The received RoF input optical signal may therefore be terminated just once by the radio unit, and then split into a plurality of simpler digital streams. The radio unit may distribute the input RoF optical signal as a plurality of output optical signals to the antenna elements of a plurality small-cells.

In an embodiment, the RoF input optical signal is a common public radio interface, CPRI, signal. The digital radio communications traffic for transmission from the plurality of antenna elements comprises a plurality of antenna-carriers. Each digital traffic stream consists of the antenna-carriers for respective antenna elements of the plurality of antenna elements and clock recovery information. An incoming CPRI signal is terminated just once by the radio unit, and then split into simpler digital streams, which support a limited set of functionalities. Generating a digital traffic stream having a simpler format than CPRI may enable the use of low cost optical transceivers, e.g. LED transceivers and grey optics, and reduced optical bandwidth compared to full CPRI links. The format of the digital traffic stream is based on the realisation that CPRI is over engineered for the distribution of antenna-carriers from a radio unit to antenna elements and that the coordination information which CPRI carries between a digital unit and a radio unit is not required during distribution from the radio unit to antenna elements.

In an embodiment, the framer is arranged to apply a light framing to the antenna-carriers to control signal synchronisation and delay. This may enable the radio unit to support carrier aggregation and time division duplex, TDD.

In an embodiment, each digital traffic stream comprises a respective plurality of antenna-carriers for at least one of the antenna elements. The radio unit may be used to serve multiple-input-multiple-output, MIMO, antenna elements. For example, the radio unit may generate a digital traffic stream comprising two antenna-carriers for a 2×MIMO antenna element.

In an embodiment, the digital receiver is a CPRI transceiver. The radio unit may therefore be used to terminate a CPRI signal and convert it into the simpler digital traffic stream.

In an embodiment, for each digital traffic stream, the framer is arranged to frame the antenna-carriers and to apply at least one of a clock recovery overhead and coding for clock recovery. In an embodiment, the coding is scrambling. The use of a simple overhead and/or coding may enable a reduced optical bandwidth to be used compared to full CPRI links.

In an embodiment, the wireless communications network radio unit further comprises an electrical routing apparatus and a digital to analogue converter, DAC. The electrical routing apparatus is arranged to receive the digital radio communications traffic from the digital receiver. The electrical routing apparatus is arranged to route the digital radio communications traffic for transmission from each of a first plurality of the antenna elements to the DAC. The electrical routing apparatus is arranged to route the digital radio communications traffic for transmission from each of a second plurality of the antenna elements to the framer.

In an embodiment, the first plurality of the antenna elements are local to the wireless communications network radio unit and the second plurality of the antenna elements are located remotely from the wireless communications network radio unit.

In an embodiment, the electrical routing apparatus comprises electrical add/drop apparatus. The radio unit may be used for both downstream and upstream traffic flow.

In an embodiment, the wireless communications network radio unit further comprises a gain controller provided before the framer. The gain controller is arranged to apply a respective gain to the digital radio communications traffic for transmission from the antenna elements of each antenna group. Gain control may therefore not be required to be performed at the antenna elements.

In an embodiment, the optical transmitter is an optical transceiver and the framer is a framer/deframer. The radio unit may be used for both downstream and upstream traffic flow.

In an embodiment, the optical transmitter is arranged to generate the RoF output optical signal carrying the digital traffic stream at a bit rate of less than 600 Mbps. The RoF output optical signal generated by the radio unit may overcome impairments faced by analogue RoF, such as cumulative effects of noise and device non-linearities. Use of a bit rate of less than 600 Mbps may enable the use of low cost optical transceivers, such as LED transceivers and grey optics.

In an embodiment, each antenna group is associated with a small cell of a wireless communications network. The radio unit may distribute the input RoF optical signal as a plurality of output optical signals to the antenna elements of a plurality small-cells.

A second aspect of the invention provides optical extender apparatus comprising an input, an optical receiver, a deframer and a digital to analogue converter, DAC. The input is arranged to receive an RoF optical signal carrying a digital traffic stream consisting of digital radio communications traffic for transmission from a plurality of antenna elements and clock recovery information. The optical receiver is arranged to receive and terminate the RoF optical signal to obtain the digital traffic stream. The deframer is arranged to deframe the digital traffic stream to obtain the digital radio communications traffic and the clock recovery information. The DAC is arranged to receive the digital radio communications traffic and the clock recovery information and is arranged to convert the digital radio communications traffic into a plurality of analogue communications signals for transmission to respective antenna elements.

The format of the digital traffic stream means that the optical extender apparatus is not required to perform digital signal processing on the received digital traffic stream, and more complex, and processing and power heavy functions, like automatic gain control are not performed at the optical extender. As a result, the optical extender may operate at low power, which may enable the optical extender apparatus to operate without any cooling. This may allow the optical extender apparatus to have a size comparable to the antenna elements.

In an embodiment, the optical receiver is an optical transceiver and the deframer is a framer/deframer. The optical extender apparatus may operate for both downstream and upstream traffic flows.

A third aspect of the invention provides a wireless communications network comprising a digital baseband unit, a wireless communications network radio unit, a first optical link coupling the digital baseband unit to the wireless communications network radio unit, optical extender apparatus, a second optical link coupling the wireless communications network radio unit to the optical extender apparatus, a plurality of antenna elements and a plurality of electrical links each coupling the optical extender apparatus to a respective one of the antenna elements. The digital baseband unit is arranged to generate and transmit an RoF optical signal carrying digital radio communications traffic for transmission from a plurality of antenna elements, synchronisation traffic and control and management. The wireless communications network radio unit is arranged to receive the RoF optical signal from the digital baseband unit and comprises an input, a digital receiver, a framer and at least one optical transmitter. The input is arranged to receive a radio over fibre, RoF, input optical signal. The RoF input optical signal carrying digital radio communications traffic for transmission from a plurality of antenna elements, synchronisation traffic, and control and management traffic. The digital receiver is arranged to receive and terminate the RoF input optical signal to obtain the digital radio communications traffic. The framer is arranged to frame the digital radio communications traffic into at least one digital traffic stream. The at least one digital traffic stream consists of the digital radio communications traffic for transmission from a plurality of the antenna elements and clock recovery information. The at least one optical transmitter is arranged to generate an RoF output optical signal carrying the digital traffic stream. The optical extender apparatus comprises an input, an optical receiver, a deframer and a digital to analogue converter, DAC. The input is arranged to receive an RoF optical signal carrying a digital traffic stream consisting of digital radio communications traffic for transmission from a plurality of antenna elements and clock recovery information. The optical receiver is arranged to receive and terminate the RoF optical signal to obtain the digital traffic stream. The deframer is arranged to deframe the digital traffic stream to obtain the digital radio communications traffic and the clock recovery information. The DAC is arranged to receive the digital radio communications traffic and the clock recovery information and is arranged to convert the digital radio communications traffic into a plurality of analogue communications signals for transmission to respective antenna elements.

The radio unit and the optical extender apparatus may enable the network to combine lumped processing points with the ability to provide optical distribution of indoor radio signal over wider areas. The radio unit and optical extender apparatus structure of this network means that minimum intermediate processing is required between the radio unit and the antenna elements, which may enable the network to be used to distribute a signal among different small-cells, that are not reachable with prior art radio units. In other word, while a daisy chain configuration requires intermediate CPRI processing, in this network a single radio unit may be used to cover all the small-cells for deployment constraints. The low cost digital optical links between the radio unit and the optical extender apparatus may remove copper distance limitation in indoor small-cells. This network may provide a full centralization of radio equipment, offering not only much higher deployment flexibility but also reduced O&M costs. Most of the digital signal processing is performed at the radio unit, with little performed at the optical extender apparatus, and this may open the possibility of new deployment scenarios.

The radio unit may terminate an incoming digital RoF, DoF, optical signal and convert it into a proprietary digital signal having a simpler format. Besides the digital radio communications traffic for transmission from the antenna elements, the "payload", the digital traffic stream only consists of information to help clock recovery at a receiver. The radio unit may enable the use of DoF but with a simpler format than conventional DoF such as CPRI. This may enable a reduced optical bandwidth to be used compared to full CPRI links. The radio unit may enable an RoF optical signal to generated which requires a minimum intermediate processing between the radio unit and antenna elements. The RoF output optical signal generated by the radio unit may overcome impairments faced analogue RoF, such as cumulative effects of noise and device non-linearities.

The format of the digital traffic stream means that the optical extender apparatus is not required to perform digital signal processing on the received digital traffic stream, and more complex, and processing and power heavy functions, like automatic gain control are not performed at the optical extender. As a result, the optical extender may operate at low power, which may enable the optical extender apparatus to operate without any cooling. This may allow the optical extender apparatus to have a size comparable to the antenna elements.

In an embodiment, the plurality of antenna elements are arranged in a plurality of antenna groups. The radio unit framer is arranged to frame the digital radio communications traffic into a plurality of digital traffic streams each consisting of the digital radio communications traffic for transmission from the antenna elements of a respective group and the clock recovery information. The radio unit comprises a plurality of optical transmitters each arranged to generate a respective RoF output optical signal carrying a respective digital traffic stream. The wireless communications network comprises a plurality of optical extender apparatus. Each optical extender apparatus is arranged to receive a respective one of the RoF output optical signals from the radio unit. Each said optical extender apparatus is coupled to the radio unit by a respective second optical link and is coupled to each antenna element of the respective group by a respective electrical link.

An incoming DoF signal is terminated just once by the radio unit, and then split into simpler digital streams, which support a limited set of functionalities. Generating a digital traffic stream having a simpler format may enable the use of low cost optical transceivers, e.g. LED transceivers and grey optics, and reduced optical bandwidth compared prior art DoF links.

In an embodiment, the digital baseband unit is arranged to generate and transmit a common public radio interface, CPRI, signal. The digital radio communications traffic for transmission from the plurality of antenna elements comprises a plurality of antenna-carriers. Each digital traffic stream consists of the antenna-carriers for respective antenna elements of the plurality of antenna elements and clock recovery information. An incoming CPRI signal is terminated just once by the radio unit, and then split into simpler digital streams, which support a limited set of functionalities. Generating a digital traffic stream having a simpler format than CPRI may enable the use of low cost optical transceivers, e.g. LED transceivers and grey optics, and reduced optical bandwidth compared to full CPRI links. The format of the digital traffic stream is based on the realisation that CPRI is over engineered for the distribution of antenna-carriers from a radio unit to antenna elements and that the coordination information which CPRI carries between a digital unit and a radio unit is not required during distribution from the radio unit to antenna elements.

In an embodiment, the framer is arranged to apply a light framing to the antenna-carriers to control signal synchronisation and delay. This may enable the network to support carrier aggregation and time division duplex, TDD.

In an embodiment, each digital traffic stream comprises a respective plurality of antenna-carriers for at least one of the antenna elements. The network may be used to serve multiple-input-multiple-output, MIMO, antenna elements. For example, the radio unit may generate a digital traffic stream comprising two antenna-carriers for a 2×MIMO antenna element.

In an embodiment, the digital receiver is a CPRI transceiver. The radio unit may therefore be used to terminate a CPRI signal and convert it into the simpler digital traffic stream.

In an embodiment, for each digital traffic stream, the framer is arranged to frame the antenna-carriers and to apply at least one of a clock recovery overhead and coding for clock recovery. In an embodiment, the coding is scrambling. The use of a simple overhead and/or coding may enable a reduced optical bandwidth to be used compared to full CPRI links and may remove the need for any digital signal processing at the optical extender apparatus. As a result, the optical extender may operate at low power, which may enable the optical extender apparatus to operate without any cooling. This may allow the optical extender apparatus to have a size comparable to the antenna elements.

In an embodiment, the wireless communications network radio unit further comprises an electrical routing apparatus and a digital to analogue converter, DAC. The electrical routing apparatus is arranged to receive the digital radio communications traffic from the digital receiver. The electrical routing apparatus is arranged to route the digital radio communications traffic for transmission from each of a first plurality of the antenna elements to the DAC. The electrical routing apparatus is arranged to route the digital radio communications traffic for transmission from each of a second plurality of the antenna elements to the framer.

In an embodiment, the first plurality of the antenna elements are local to the wireless communications network radio unit and the second plurality of the antenna elements are located remotely from the wireless communications network radio unit.

In an embodiment, the electrical routing apparatus comprises electrical add/drop apparatus. The radio unit may be used for both downstream and upstream traffic flow.

In an embodiment, the wireless communications network radio unit further comprises a gain controller provided before the framer. The gain controller is arranged to apply a respective gain to the digital radio communications traffic for transmission from the antenna elements of each antenna group. More complicated functions, like automatic gain control are therefore managed by the radio unit, enabling the optical extender apparatus to maintain a simple, low power operation.

In an embodiment, the radio unit is arranged to generate a management signal to the optical extender apparatus. The management signal is transmitted using an in-band channel.

In an embodiment, the optical transmitter is an optical transceiver and the framer is a framer/deframer. The radio unit may be used for both downstream and upstream traffic flow.

In an embodiment, the optical transmitter is arranged to generate the RoF output optical signal carrying the digital traffic stream at a bit rate of less than 600 Mbps. The RoF output optical signal generated by the radio unit may overcome impairments faced by analogue RoF, such as cumulative effects of noise and device non-linearities. Use of a bit rate of less than 600 Mbps may enable the use of low cost optical transceivers, such as LED transceivers and grey optics.

In an embodiment, each antenna group is associated with a small cell of a wireless communications network. The radio unit may distribute the input RoF optical signal as a plurality of output optical signals to the antenna elements of a plurality small-cells.

A fourth aspect of the invention provides a method of transmitting communications traffic in a wireless communications network. The method comprises steps a. to d., as follows. Step a. comprises receiving a radio over fibre, RoF, input optical signal carrying digital radio communications traffic for transmission from a plurality of antenna elements, synchronisation traffic and control and management traffic. Step b. comprises obtaining the digital radio communications traffic from the RoF input optical signal. Step c. comprises framing the digital radio communications traffic into at least one digital traffic stream consisting of the digital radio communications traffic for transmission from a plurality of the antenna elements and clock recovery information. Step d. comprises generating an RoF output optical signal carrying the digital traffic stream.

The method may terminate an incoming digital RoF, DoF, optical signal and convert it into a proprietary digital signal having a simpler format. Besides the digital radio communications traffic for transmission from the antenna elements, the "payload", the digital traffic stream only consists of information to help clock recovery at a receiver. The method may enable the use of DoF but with a simpler format than conventional DoF such as CPRI. This may enable a reduced optical bandwidth to be used compared to full CPRI links. The method may enable an RoF optical signal to generated which requires a minimum intermediate processing between the radio unit and antenna elements. The RoF output optical signal generated by the method may overcome impairments faced analogue RoF, such as cumulative effects of noise and device non-linearities.

In an embodiment, the plurality of antenna elements are arranged in a plurality of antenna groups. In step c., the digital radio communications traffic is framed into a plurality of digital traffic streams each consisting of the digital radio communications traffic for transmission from the antenna elements of a respective group and the clock recovery information. In step d., a plurality of RoF output optical signals are generated, each carrying a respective digital traffic stream. The received RoF input optical signal may therefore be terminated just once, and then split into a plurality of simpler digital streams. The method may distribute the input RoF optical signal as a plurality of output optical signals to the antenna elements of a plurality small-cells.

In an embodiment, the RoF input optical signal is a common public radio interface, CPRI, signal. The digital radio communications traffic for transmission from the plurality of antenna elements comprises a plurality of antenna-carriers. Each digital traffic stream consists of the antenna-carriers for respective antenna elements of the plurality of antenna elements and clock recovery information. An incoming CPRI signal is terminated just once, and then split into simpler digital streams, which support a limited set of functionalities. Generating a digital traffic stream having a simpler format than CPRI may enable the use of low cost optical transceivers, e.g. LED transceivers and grey optics, and reduced optical bandwidth compared to full CPRI links. The format of the digital traffic stream is based on the realisation that CPRI is over engineered for the distribution of antenna-carriers from RU to antenna elements and that the coordination information which CPRI carries between a digital unit and a radio unit is not required during distribution from the radio unit to antenna elements.

In an embodiment, a light framing is applied to the antenna-carriers to control signal synchronisation and delay. This may enable the method to support carrier aggregation and time division duplex, TDD.

In an embodiment, each digital traffic stream comprises a respective plurality of antenna-carriers for at least one of the antenna elements. The method may be used with multiple-input-multiple-output, MIMO, antenna elements. For example, a digital traffic stream comprising two antenna-carriers may be generated for a 2×MIMO antenna element.

In an embodiment, step c. comprises, for each digital traffic stream, framing the antenna-carriers and applying at least one of a clock recovery overhead and coding for clock recovery. In an embodiment, the coding is scrambling. The use of a simple overhead and/or coding may enable a reduced optical bandwidth to be used compared to full CPRI links.

In an embodiment, step b. further comprises converting the digital radio communications traffic for transmission from each of a first plurality of the antenna elements into a plurality of analogue communications signals for transmission to respective antenna elements of the first plurality of antenna elements. Step c. and step d. are performed for the digital radio communications traffic for transmission from each of a second plurality of the antenna elements. The method may be used to deliver digital radio communications traffic to local antenna elements at step b. and to deliver digital radio communications traffic to local antenna elements through steps c. and d.

In an embodiment, the method further comprise, before framing, applying a respective gain to the digital radio communications traffic for transmission from the antenna elements of each antenna group. Gain control may therefore not be required to be performed at the antenna elements.

In an embodiment, the RoF output optical signal generated at step b. carries the digital traffic stream at a bit rate of less than 600 Mbps. The RoF output optical signal may overcome impairments faced by analogue RoF, such as cumulative effects of noise and device non-linearities. Use of a bit rate of less than 600 Mbps may enable the use of low cost optical transceivers, such as LED transceivers and grey optics.

In an embodiment, each antenna group is associated with a small cell of a wireless communications network. The method may be applied to distribute the input RoF optical signal as a plurality of output optical signals to the antenna elements of a plurality small-cells.

A fifth aspect of the invention provides a method of extending the transmission of communications traffic in a wireless communications network. The method comprises steps i. to iii. as follows. Step i. comprises receiving an RoF optical signal carrying a digital traffic stream consisting of digital radio communications traffic for transmission from a plurality of antenna elements and clock recovery information. Step i. further comprises terminating the RoF optical signal to obtain the digital traffic stream. Step ii. comprises deframing the digital traffic stream to obtain the digital radio communications traffic for transmission from the plurality of antenna elements and the clock recovery information. Step iii. comprises converting the digital radio communications traffic for transmission from the plurality of antenna elements into a plurality of analogue communications signals for transmission to respective antenna elements of the plurality of antenna elements.

The format of the digital traffic stream means that digital signal processing is not required to be performed on the received digital traffic stream, and more complex, and processing and power heavy functions, like automatic gain control are not performed during transmission extension. As a result, the method may be implemented by apparatus operating at low power, which may remove the need for cooling.

A sixth aspect of the invention provides a method of extended transmission in a wireless communication network. The method comprises steps a. to d., as follows, which are performed at a first location. Step a. comprises receiving a radio over fibre, RoF, input optical signal carrying digital radio communications traffic for transmission from a plurality of antenna elements, synchronisation traffic and control and management traffic. Step b. comprises obtaining the digital radio communications traffic from the RoF input optical signal. Step c. comprises framing the digital radio communications traffic into at least one digital traffic stream consisting of the digital radio communications traffic for transmission from a plurality of the antenna elements and clock recovery information. Step d. comprises generating an RoF output optical signal carrying the digital traffic stream. The method comprises transmitting the RoF output optical signal from the first location to a second location, which is remote from the first location. The method comprises steps i. to iii. as follows, performed at the second location. Step i. comprises receiving the RoF optical signal output from the first location and terminating the RoF optical signal to obtain the digital traffic stream. Step ii. comprises deframing the digital traffic stream to obtain the digital radio communications traffic for transmission from the plurality of antenna elements and the clock recovery information. Step iii. comprises converting the digital radio communications traffic for transmission from the plurality of antenna elements into a plurality of analogue communications signals for transmission to respective antenna elements of the plurality of antenna elements.

The method may terminate an incoming digital RoF, DoF, optical signal and convert it into a proprietary digital signal having a simpler format. Besides the digital radio communications traffic for transmission from the antenna elements, the "payload", the digital traffic stream only consists of information to help clock recovery at a receiver. The method may enable the use of DoF but with a simpler format than conventional DoF such as CPRI. This may enable a reduced optical bandwidth to be used compared to full CPRI links. The method may enable an RoF optical signal to generated which requires a minimum intermediate processing between the radio unit and antenna elements. The RoF output optical signal generated by the method may overcome impairments faced analogue RoF, such as cumulative effects of noise and device non-linearities. The format of the digital traffic stream means that digital signal processing is not required to be performed on the received digital traffic stream, and more complex, and processing and power heavy functions, like automatic gain control are not performed during transmission extension. As a result, the method may be implemented by apparatus operating at low power, which may remove the need for cooling.

In an embodiment, the plurality of antenna elements are arranged in a plurality of antenna groups. In step c., the digital radio communications traffic is framed into a plurality of digital traffic streams each consisting of the digital radio communications traffic for transmission from the antenna elements of a respective group and the clock recovery information. In step d., a plurality of RoF output optical signals are generated, each carrying a respective digital traffic stream. The received RoF input optical signal may therefore be terminated just once, and then split into a plurality of simpler digital streams. The method may distribute the input RoF optical signal as a plurality of output optical signals to the antenna elements of a plurality small-cells.

In an embodiment, the RoF input optical signal is a common public radio interface, CPRI, signal. The digital radio communications traffic for transmission from the plurality of antenna elements comprises a plurality of antenna-carriers. Each digital traffic stream consists of the antenna-carriers for respective antenna elements of the plurality of antenna elements and clock recovery information. An incoming CPRI signal is terminated just once, and then split into simpler digital streams, which support a limited set of functionalities. Generating a digital traffic stream having a simpler format than CPRI may enable the use of low cost optical transceivers, e.g. LED transceivers and grey optics, and reduced optical bandwidth compared to full CPRI links. The format of the digital traffic stream is based on the realisation that CPRI is over engineered for the distribution of antenna-carriers from RU to antenna elements and that the coordination information which CPRI carries between a digital unit and a radio unit is not required during distribution from the radio unit to antenna elements.

In an embodiment, a light framing is applied to the antenna-carriers to control signal synchronisation and delay. This may enable the method to support carrier aggregation and time division duplex, TDD.

In an embodiment, each digital traffic stream comprises a respective plurality of antenna-carriers for at least one of the antenna elements. The method may be used with multiple-input-multiple-output, MIMO, antenna elements. For example, a digital traffic stream comprising two antenna-carriers may be generated for a 2×MIMO antenna element.

In an embodiment, step c. comprises, for each digital traffic stream, framing the antenna-carriers and applying at least one of a clock recovery overhead and coding for clock recovery. In an embodiment, the coding is scrambling. The use of a simple overhead and/or coding may enable a reduced optical bandwidth to be used compared to full CPRI links.

In an embodiment, step b. further comprises converting the digital radio communications traffic for transmission from each of a first plurality of the antenna elements into a plurality of analogue communications signals for transmission to respective antenna elements of the first plurality of antenna elements. Step c. and step d. are performed for the digital radio communications traffic for transmission from each of a second plurality of the antenna elements. The method may be used to deliver digital radio communications traffic to local antenna elements at step b. and to deliver digital radio communications traffic to local antenna elements through steps c. and d.

In an embodiment, the method further comprise, before framing, applying a respective gain to the digital radio communications traffic for transmission from the antenna elements of each antenna group. Gain control may therefore not be required to be performed at the antenna elements.

In an embodiment, the RoF output optical signal generated at step b. carries the digital traffic stream at a bit rate of less than 600 Mbps. The RoF output optical signal may overcome impairments faced by analogue RoF, such as cumulative effects of noise and device non-linearities. Use of a bit rate of less than 600 Mbps may enable the use of low cost optical transceivers, such as LED transceivers and grey optics.

In an embodiment, each antenna group is associated with a small cell of a wireless communications network. The method may be applied to distribute the input RoF optical signal as a plurality of output optical signals to the antenna elements of a plurality small-cells.

A seventh aspect of the invention provides a computer program, comprising instructions which, when executed on at least one processor, cause the at least one processor to carry out any of the above steps of the method of transmitting communications traffic in a wireless communications network.

An eighth aspect of the invention provides a computer program, comprising instructions which, when executed on at least one processor, cause the at least one processor to carry out any of the above steps of the method of extending the transmission of communications traffic in a wireless communications network.

A ninth aspect provides a carrier containing a computer program as described above, wherein the carrier is one of an electronic signal, optical signal, radio signal, or computer readable storage medium.

Embodiments of the invention will now be described, by way of example only, with reference to the accompanying drawings.

DETAILED DESCRIPTION

The same reference numbers will used for corresponding features in different embodiments.

Figure 1:
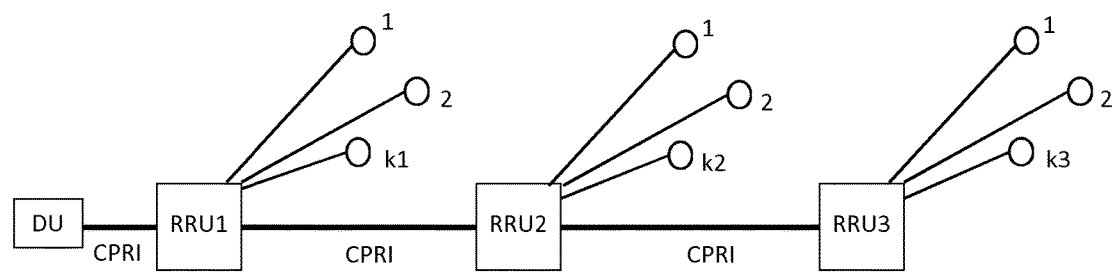
FIG. 1 shows a prior art daisy chain of radio units connected by CPRI links, each radio unit serving group of local antennas.
Figure 2:
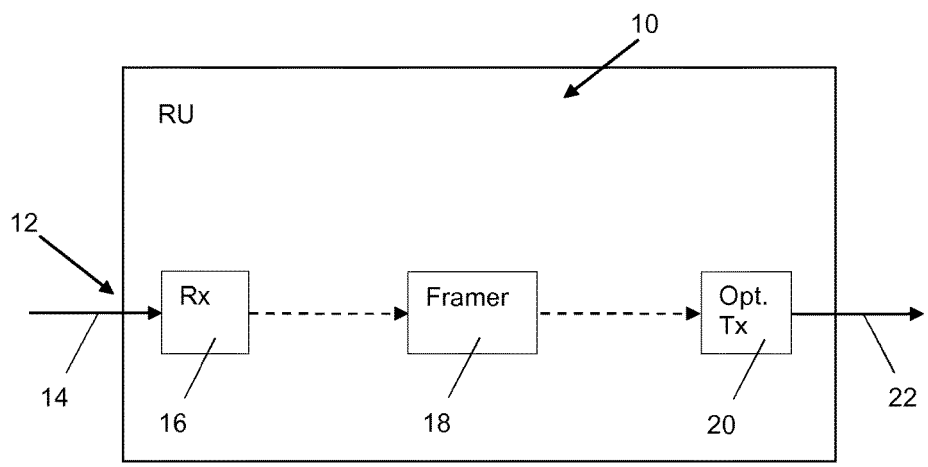
FIG. 2 is a schematic representation of a wireless communications network radio unit according to a first embodiment of the invention.

Referring to FIG. 2, a first embodiment of the invention provides a wireless communications network radio unit, RU, 10 comprising an input 12, a digital receiver, Rx, 16, a framer 18 and an optical transmitter, Tx, 20.

The input 12 is arranged to receive a radio over fibre, RoF, input optical signal 14, which carries digital radio communications traffic for transmission from a plurality of antenna elements, synchronisation traffic and control and management traffic. The digital receiver 16 is arranged to receive and terminate the RoF input optical signal to obtain the digital radio communications traffic. The framer 18 is arranged to frame the digital radio communications traffic into a digital traffic stream. The digital traffic stream consists of the digital radio communications traffic for transmission from a plurality of the antenna elements and clock recovery information. The optical transmitter 20 is arranged to generate an RoF output optical signal 22 carrying the digital traffic stream.

Figure 3:
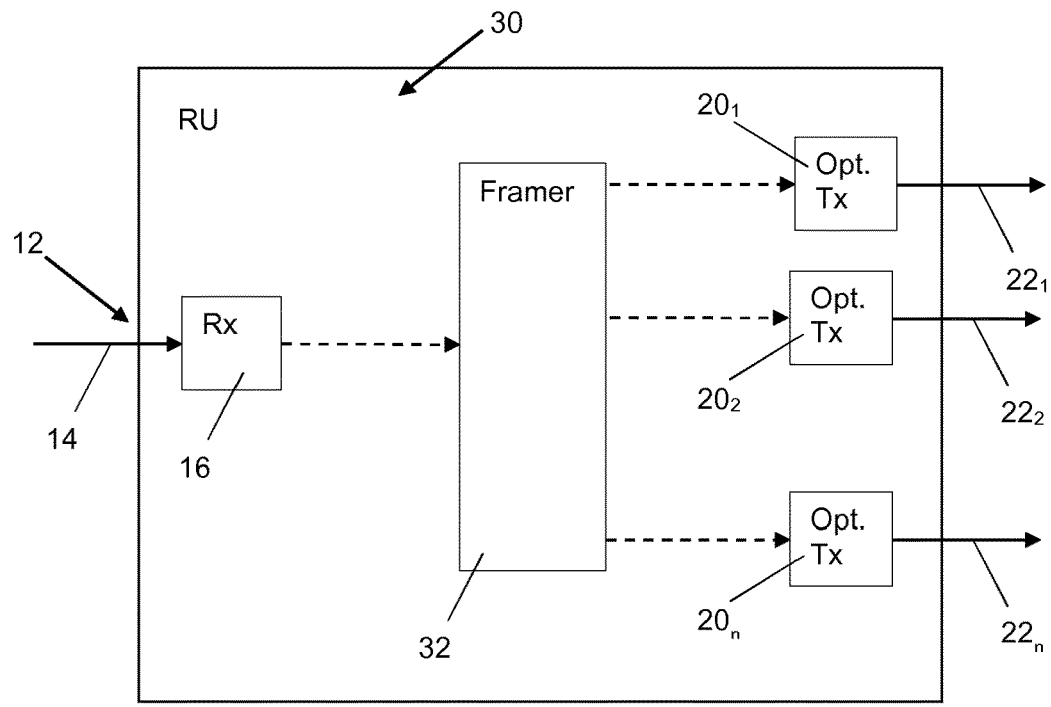
FIG. 3 is a schematic representation of a wireless communications network radio unit according to a second embodiment of the invention.

A second embodiment of the invention provides a wireless communications network radio unit, RU, 30 as shown in FIG. 3. The radio unit 30 of this embodiment is similar to the radio unit 10 of the first embodiment, with the following modifications.

The radio unit 30 of this embodiment is for use with a plurality of antenna elements, which are arranged in a plurality of antenna groups. The framer 32 is arranged to frame the digital radio communications traffic into a plurality of digital traffic streams. Each digital traffic stream each consists of the digital radio communications traffic for transmission from the antenna elements of a respective group and the clock recovery information.

In this embodiment, a plurality of optical transmitters $20_{1-n}$ are provided within the radio unit, each optical transmitter being arranged to generate a respective RoF output optical signal $22_{1-n}$ carrying a respective digital traffic stream.

Figure 4:
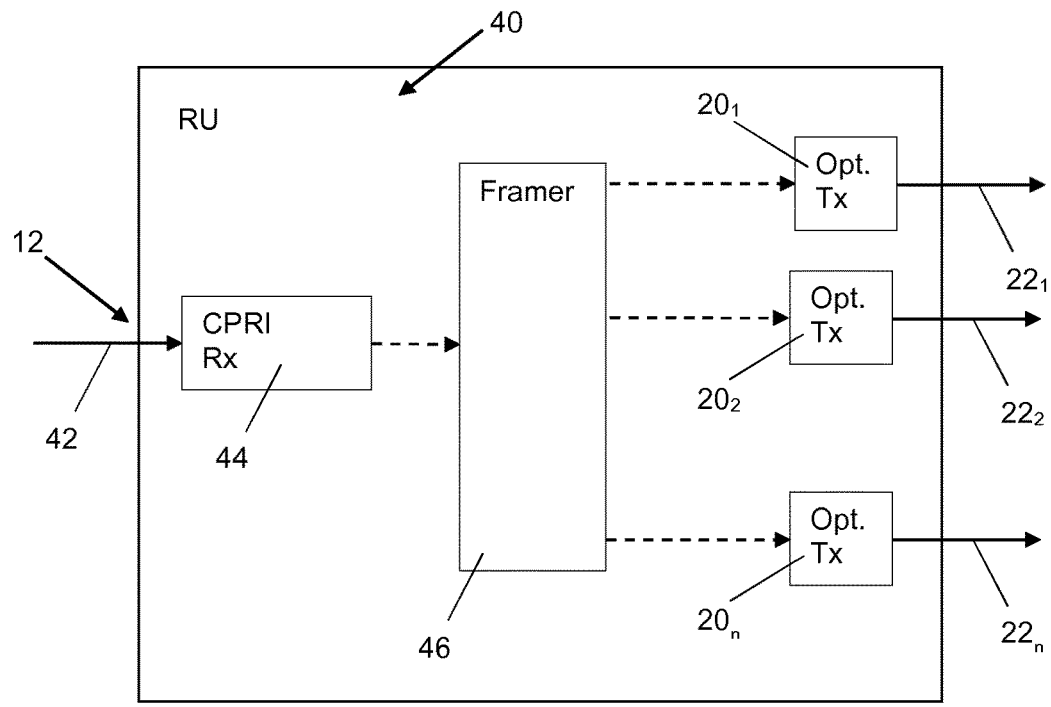
FIG. 4 is a schematic representation of a wireless communications network radio unit according to a third embodiment of the invention.

A third embodiment of the invention provides a wireless communications network radio unit, RU, 40 as shown in FIG. 4. The radio unit 40 of this embodiment is similar to the radio unit 30 of the previous embodiment, with the following modifications.

The input 12 is arranged to receive a common public radio interface, CPRI, input optical signal 42. The digital radio communications traffic for transmission from the plurality of antenna elements comprises a plurality of antenna-carriers. Each digital traffic stream consists of the antenna-carriers for respective antenna elements of the plurality of antenna elements and clock recovery information.

As defined in the CPRI Specification v6.0 of 30 Aug. 2013, an antenna-carrier is the amount of digital baseband, IQ, U-plane data necessary for either reception or transmission of one carrier at one independent antenna element.

The digital receiver is a CPRI receiver 44, which is arranged to receive and terminate the CPRI input optical signal and to obtain the antenna-carriers. The framer 46 is arranged to frame the antenna-carriers for each digital traffic stream and to apply a clock recovery overhead and/or coding for clock recovery. The coding may, for example, be scrambling.

Figure 5:
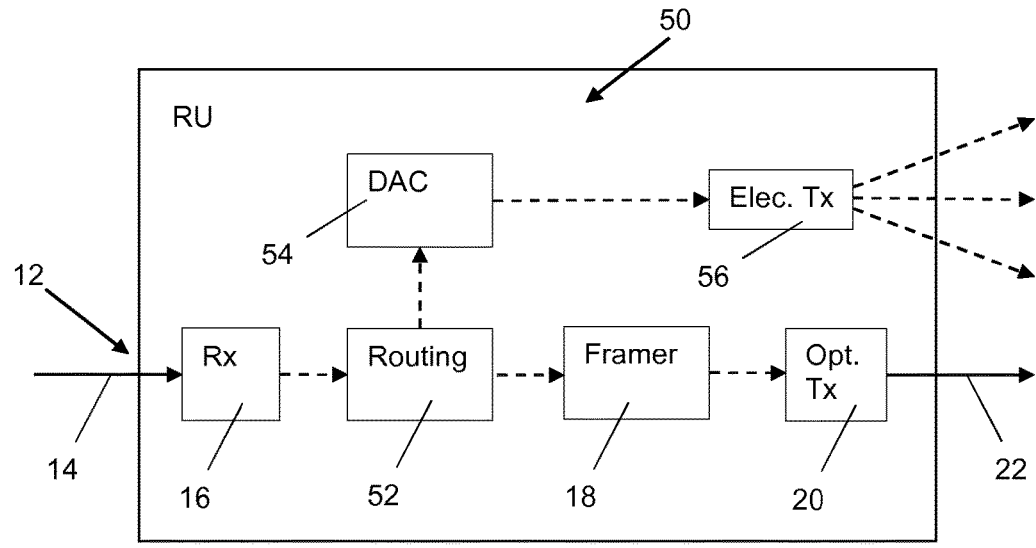
FIG. 5 is a schematic representation of a wireless communications network radio unit according to a fourth embodiment of the invention.

A fourth embodiment of the invention provides a wireless communications network radio unit, RU, 50 as shown in FIG. 5. The radio unit 50 of this embodiment is similar to the radio unit 10 of the first embodiment, with the following modifications.

In this embodiment the radio unit is also provided with an electrical routing apparatus 52 and a digital to analogue converter, DAC, 54. The electrical routing apparatus is arranged to receive the digital radio communications traffic from the digital receiver 16 and to route the digital radio communications traffic for transmission from each of a first plurality of the antenna elements to the DAC. The DAC converts the digital radio communications traffic into analogue communications traffic, for transmission from an electrical transmitter 56.

The electrical routing apparatus is arranged to route the digital radio communications traffic for transmission from each of a second plurality of the antenna elements to the framer 18. The digital radio communications traffic for transmission from the second plurality of the antenna elements is processed by the framer 18 and the optical transmitter 20 as described above.

Figure 6:
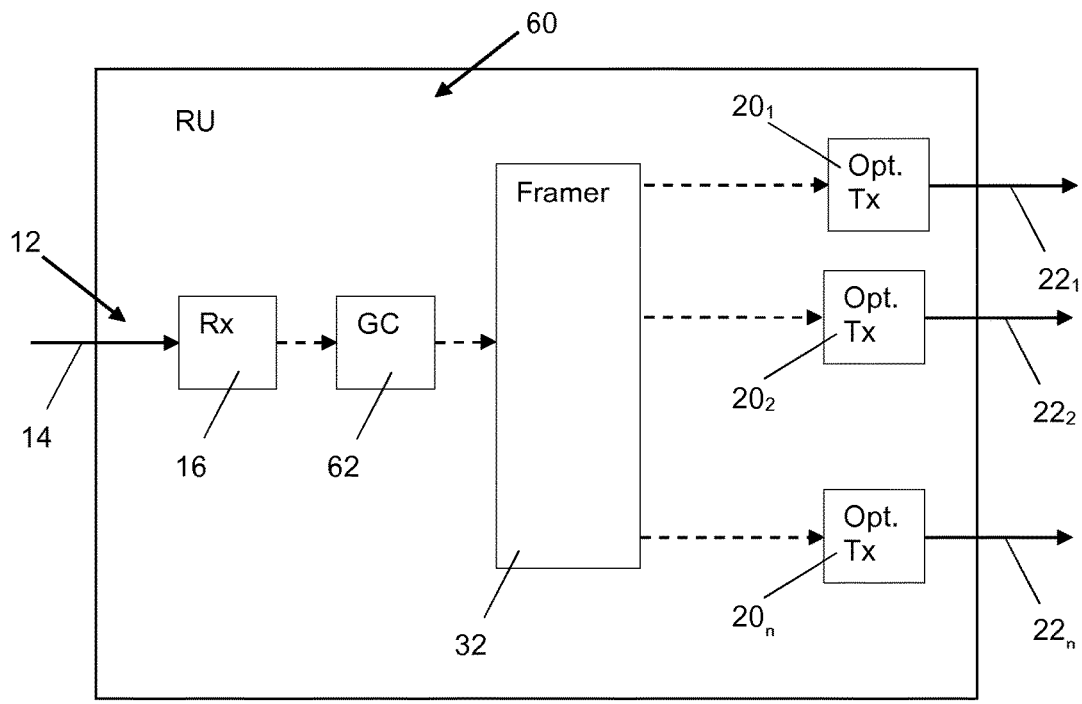
FIG. 6 is a schematic representation of a wireless communications network radio unit according to a fifth embodiment of the invention.

A fifth embodiment of the invention provides a wireless communications network radio unit, RU, 60 as shown in FIG. 6. The radio unit 60 of this embodiment is similar to the radio unit 30 of the second embodiment, with the following modifications.

In this embodiment, a gain controller, GC, 62 is additionally provided in the radio unit 60, before the framer. The gain controller is arranged to apply a respective gain to the digital radio communications traffic for the antenna elements of each antenna group. The gain controller may be arranged to perform automatic gain control, AGC, a function which will be well known to the skilled person.

Figure 7:
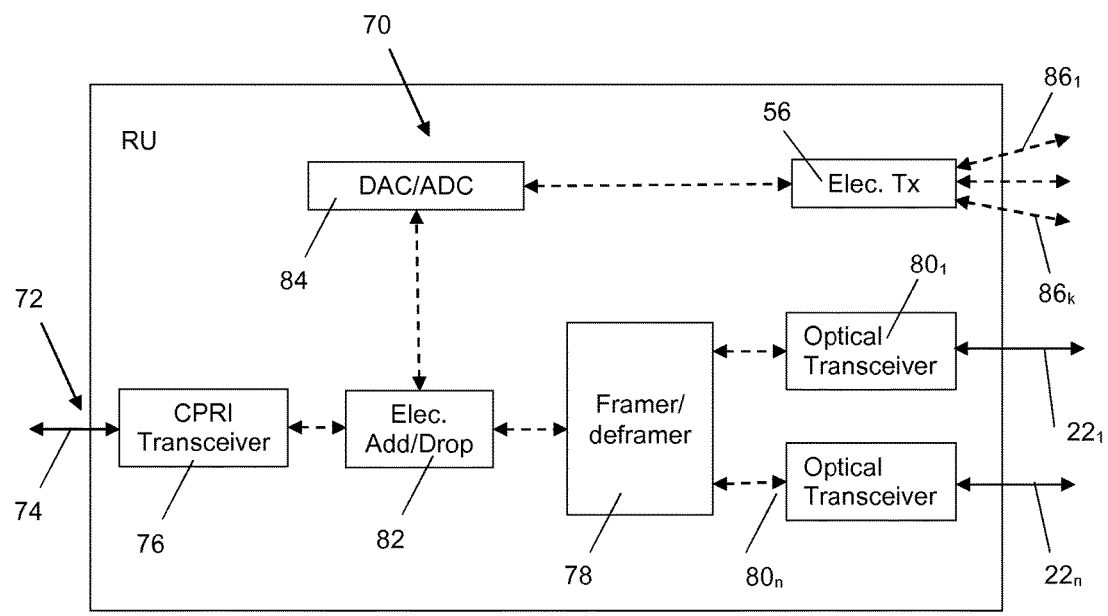
FIG. 7 is a schematic representation of a wireless communications network radio unit according to a sixth embodiment of the invention.

FIG. 7 shows a wireless communications network radio unit, RU, 70 according to a sixth embodiment of the invention. The radio unit of this embodiment is similar to the radio unit 50 described with reference to FIG. 5, with the following modifications.

The radio unit 70 of this embodiment is for use with a plurality of antenna elements. The digital receiver is a CPRI transceiver 76, the routing apparatus is an electrical add/drop 82, the framer is a framer/deframer 78, the DAC is a DAC/ADC 84, and the optical transmitters are optical transceivers $80_{1-n}$. It will be appreciated that the radio unit 70 is therefore capable of supporting both downstream and upstream transmission.

The input 72 is arranged to receive a CPRI input optical signal 74, carrying a plurality of antenna-carriers, A×C, for a plurality of antenna elements. The CPRI transceiver 76 is arranged to receive and terminate the CPRI input optical signal and to obtain the antenna-carriers. The CPRI signal is terminated just once at the radio unit 70, where it is then split into simpler digital streams, which support a limited set of functionalities.

The electrical add/drop, which may also be referred to as an A×C add/drop, is arranged to receive the antenna-carriers from the digital receiver 16. The electrical add/drop is arranged to drop antenna-carriers for a first plurality of the antenna elements to the DAC/ADC 84 and to pass-through the antenna-carriers for a second plurality of the antenna elements to the framer/deframer 78. The first plurality of antenna elements will be located locally to the radio unit 70, typically no more than 200 m from the radio unit, and the second plurality of antenna elements will be located remote from the radio unit, i.e. typically more than 200 m from the radio unit. The second plurality of antenna elements are arranged in a plurality of antenna groups, which may correspond to a plurality of small-cells of a wireless communications network.

The DAC/ADC converts the antenna-carriers into analogue communications traffic, for transmission on electrical signals $86_{1-n}$ generated by the electrical transmitter 56. Each electrical signal is for a respective local antenna element, and can be transmitted on a respective copper link, such as a local area network, LAN, cable.

The framer/deframer 78 is arranged to frame the antenna-carriers into a plurality of digital traffic streams and to apply a clock recovery overhead and/or coding for clock recovery. The coding may, for example, be scrambling. Each digital traffic stream therefore consists of the antenna-carriers for the antenna elements of a respective antenna group and the clock recovery information. The framer/deframer 78 may also be arranged to apply a light framing for A×C to control signal synchronization and delay, e.g. for carrier aggregation or for TDD.

Each digital traffic stream has a low data rate, of about 600 Mbit/s, corresponding to a 20 MHz bandwidth signal sampled according to Nyquist theorem and digitally converted with 15 bit resolution ADC.

Figure 8:
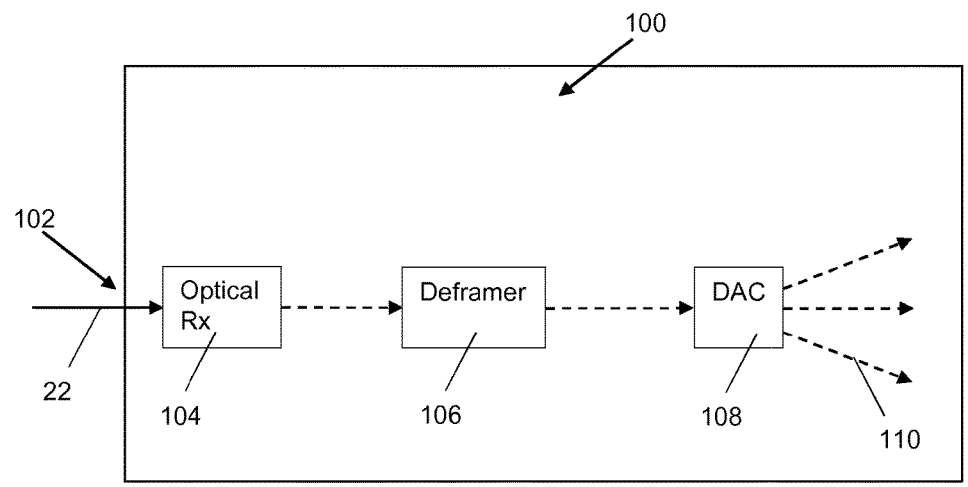
FIG. 8 is a schematic representation of optical extender apparatus according to a seventh embodiment of the invention.

Referring to FIG. 8, a seventh embodiment of the invention provides optical extender apparatus 100 comprising an input 102, an optical receiver 104, a deframer 106, and a DAC 108.

The input 102 is arranged to receive an RoF optical signal 22 carrying a digital traffic stream consisting of digital radio communications traffic for transmission from a plurality of antenna elements and clock recovery information. The optical receiver 104 is arranged to receive and terminate the RoF optical signal to obtain the digital traffic stream.

The deframer 106 is arranged to deframe the digital traffic stream to obtain the digital radio communications traffic and the clock recovery information. The DAC 108 is arranged to receive the digital radio communications traffic and the clock recovery information and is arranged to convert the digital radio communications traffic into a plurality of analogue communications signals 110 for transmission to respective antenna elements. The DAC performs the digital to analogue conversion operation that would conventionally be performed by a prior art radio unit.

Due to the nature of the digital traffic stream, the optical extender apparatus 100 does not need to perform any digital signal processing on the digital traffic stream, only digital to analogue conversion following deframing. Consequently, a low performance optical receiver may be used and the deframer and the DAC may be implemented as an electrical chip set. This means that no cooling is required within the optical extender apparatus and the power consumption and size of the optical extender apparatus may therefore be small compared to the radio unit, and may in fact be comparable to that of an antenna elements.

Figure 9:
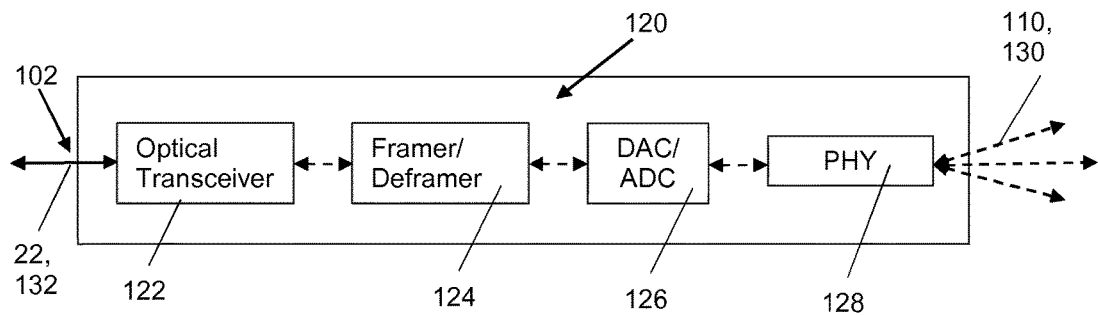
FIG. 9 is a schematic representation of optical extender apparatus according to an eighth embodiment of the invention.

An eighth embodiment of the invention provides optical extender apparatus 120 as shown in FIG. 9, which is similar to the optical extender apparatus 100 of the previous embodiment.

In this embodiment, the optical receiver is an optical transceiver 122, the deframer is a framer/deframer 124, and the DAC is a DAC/ADC 126. The optical extender apparatus is also provided with an electrical transceiver, PHY, 128, arranged to transmit and receive electrical signals 110, 130 on copper links to the antenna elements. It will be appreciated that the optical extender apparatus 120 is therefore capable of supporting both downstream and upstream transmission.

Figure 10:
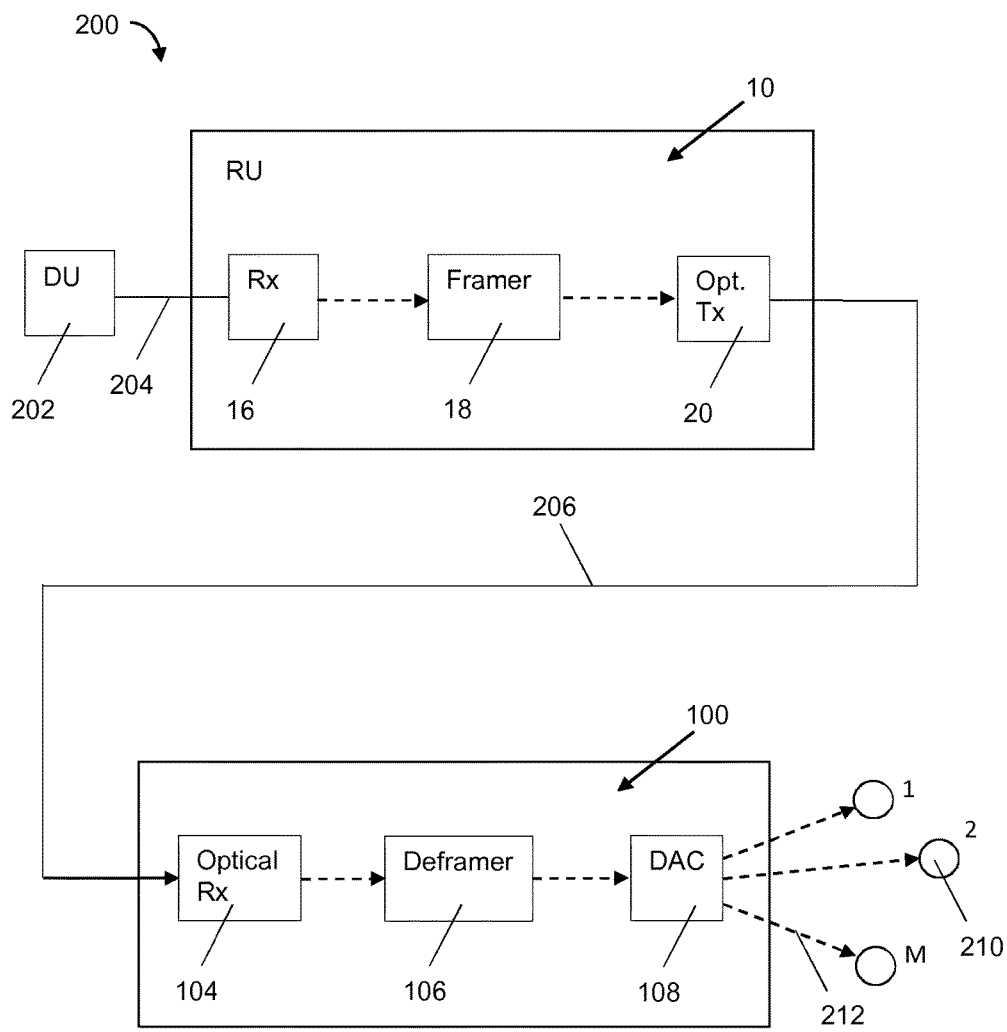
FIG. 10 is a schematic representation of a wireless communications network according to a ninth embodiment of the invention.

Referring to FIG. 10, a ninth embodiment of the invention provides a wireless communications network 200 comprising a digital baseband unit, DU, 202, a wireless communications network radio unit 10, a first optical link 204 coupling the digital baseband unit to the radio unit, optical extender apparatus 100, a second optical link 206 coupling the radio unit to the optical extender apparatus, a plurality, 1-M, of antenna elements 210 and a plurality of electrical links 212 each coupling the optical extender apparatus to a respective one of the antenna elements.

The digital unit 202 is arranged to generate and transmit an RoF optical signal carrying digital radio communications traffic for transmission from a plurality of antenna elements, synchronisation traffic and control and management. The RoF optical signal is transmitted to the radio unit 10 over the first optical link 204.

The wireless communications network radio unit 10 is arranged to receive the RoF optical signal from the digital baseband unit. In this embodiment, a radio unit 10 according to the first embodiment is used but it will be appreciated that a radio unit according to any of the second to sixth embodiments, shown in FIGS. 3 to 7, may alternatively be used. The RoF output optical signal generated by the radio unit is transmitted to the optical extender apparatus 100 over the second optical link 206.

An optical extender apparatus 100 according to the eighth embodiment of the invention is shown in use in this embodiment, but it will be appreciated that the optical extender apparatus of the ninth embodiment may alternatively be used.

The radio unit 10 and the optical extender apparatus 100 may be considered to together form a more complex radio unit having a split architecture.

Figure 11:
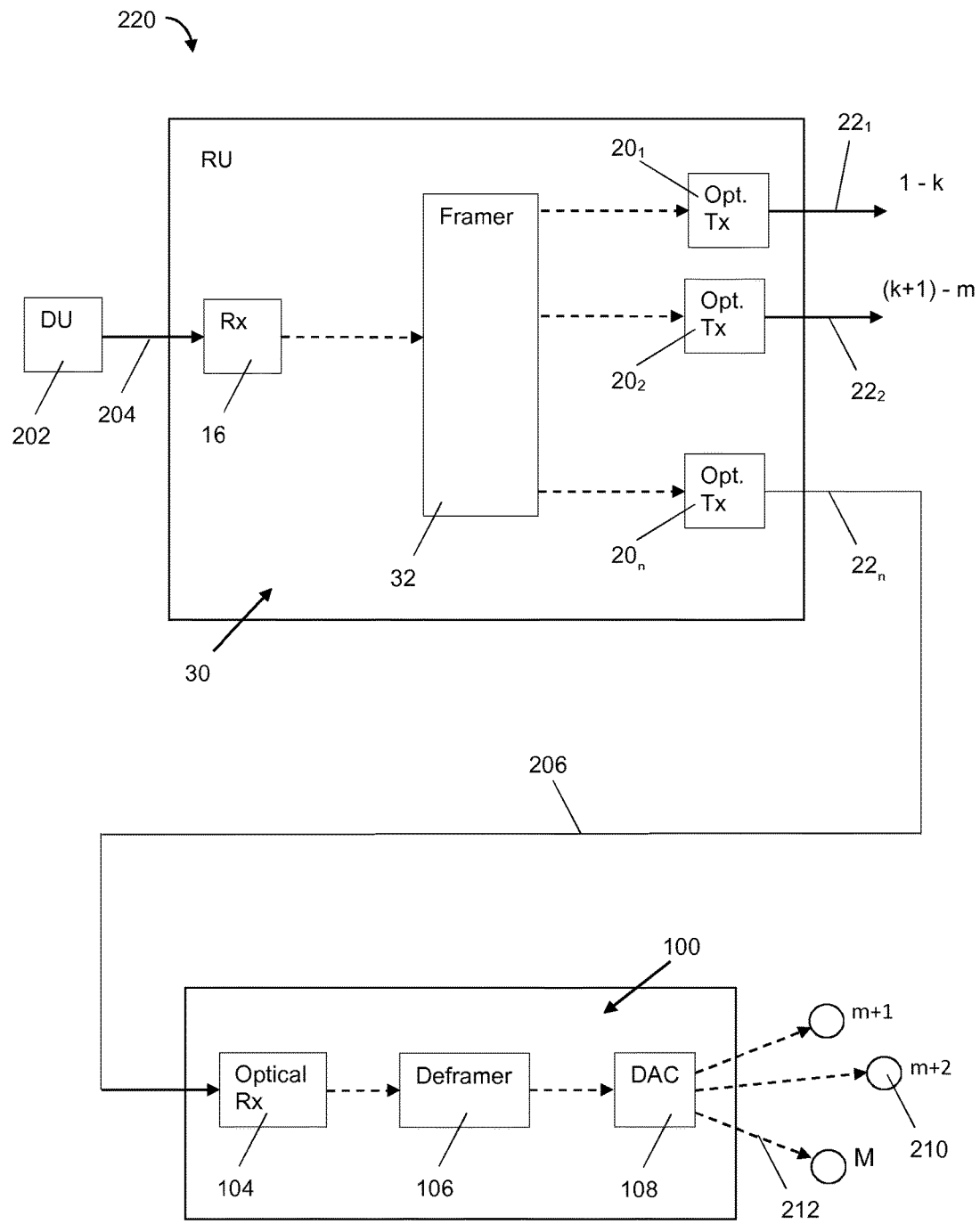
FIG. 11 is a schematic representation of a wireless communications network according to a tenth embodiment of the invention.

A tenth embodiment of the invention provides a wireless communications network 220 as shown in FIG. 11. The network 220 of this embodiment is similar to the network 200 of the previous embodiment, with the following modifications.

In this embodiment, a radio unit 30 according to the second embodiment, as shown in FIG. 3, is used but it will be appreciated that any of the radio units 40, 50, 60, 70 described above may alternatively be used.

The plurality, M, of antenna elements 210 are arranged in a plurality, 1 to n, of antenna groups. The first antenna group comprises antenna elements 1 to k, the second group comprises antenna elements (k+1) to m, and the $n^{th}$ antenna group comprises antenna elements m+1 to M. Only the first, second and $n^{th}$ antenna groups are shown for reasons of clarity but it will be understood that there may be a plurality of antenna groups between the second and $n^{th}$ groups.

The framer 32 is arranged to frame the digital radio communications traffic into a plurality of digital traffic streams each consisting of the digital radio communications traffic for transmission from the antenna elements of a respective group and the clock recovery information. The radio unit 30 comprises a plurality of optical transmitters $20_{1-n}$ each arranged to generate a respective RoF output optical signal $22_{1-n}$ carrying a respective digital traffic stream.

The wireless communications network 220 of this embodiment comprises a plurality of optical extender apparatus 100, each arranged to receive a respective one of the RoF output optical signals $22_{1-n}$ from the radio unit 30. Each optical extender apparatus is coupled to the radio unit by a respective second optical link 206 and is coupled to each antenna element of the respective group by a respective electrical link 212.

Figure 12:
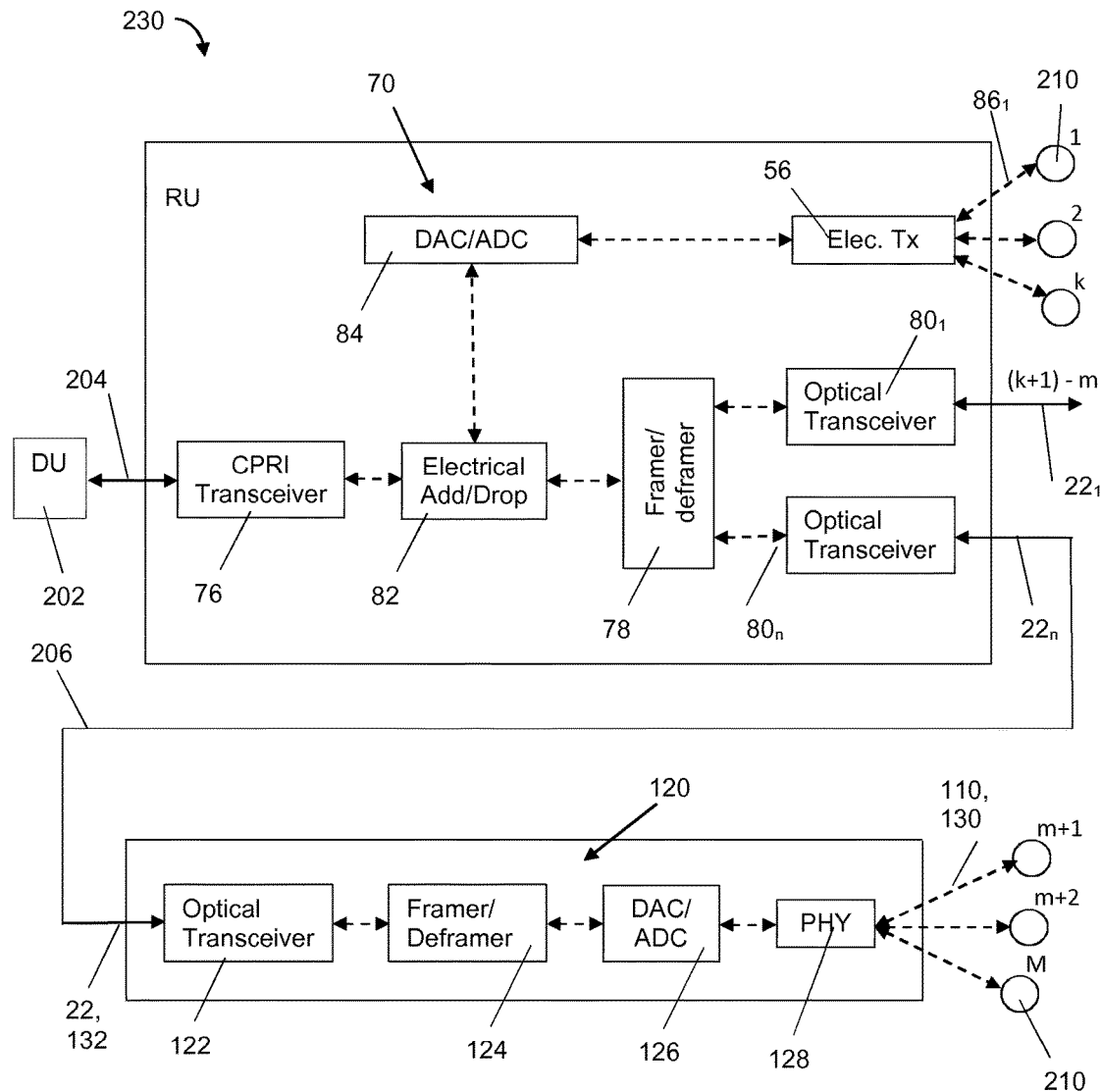
FIG. 12 is a schematic representation of a wireless communications network according to an eleventh embodiment of the invention.

An eleventh embodiment of the invention provides a wireless communications network 230 as shown in FIG. 12. The network 230 of this embodiment is similar to the network 200 of the previous embodiment, with the following modifications.

In this embodiment, a radio unit 70 according to the sixth embodiment of the invention is, as shown in FIG. 7. The first antenna group, comprising antenna elements 1 to k, is provided locally to the radio unit 70. The antenna elements 1 to k receive respective electrical signals $86_{1-k}$ from the electrical transmitter 56.

Each of the second to $n^{th}$ antenna groups are located remote from the radio unit 70 and are connected to the radio unit via respective second optical links 206 and optical extender apparatus 120. Optical extender apparatus 120 according to the eighth embodiment of the invention, as shown in FIG. 9, are used in this embodiment.

The radio unit 70 terminates an incoming CPRI signal 204, from the digital unit, 202 and converts it into a plurality of proprietary digital traffic streams, each to be transmitted to a respective remote optical extender apparatus 120, and a plurality of analogue signals, to be sent to local antennas elements $210_{1-k}$. Each optical extender apparatus 120 receives a respective digital traffic stream from the radio unit and splits it in a plurality of analogue converted signals, which are then transmitted to antenna elements of the respective antenna group, which are located locally to the optical extender apparatus. Each optical extender apparatus 120 has a size comparable with the one of antenna elements.

The radio unit 70 is therefore arranged to convert antenna-carriers for transmission to local antenna elements, and to transmit and receive digital traffic streams in the optical domain to serve remote antenna elements. Besides the digital communications traffic payload, the only thing that needs to be transmitted is a simple overhead and/or coding (e.g. scrambling) to help clock recovery in the DAC/ADC 126 of the optical extender apparatus 120. The digital traffic stream has a low rate data of about 600 Mbit/s, corresponding to a 20 MHz bandwidth signal sampled according to Nyquist theorem and digitally converted with 15 bit resolution ADC.

The optical extender apparatus 120 is arranged to perform media conversion, from optical to electrical and vice versa, DAC/ADC and light framing of antenna-carriers, for distributing and combining electrical signals from antenna elements located locally to the optical extender apparatus. More complicated functions, like gain control, are performed at the radio unit 70. For example, if different gains need to be set for different antenna groups, this is done at the radio unit, i.e. before the optical extender apparatus 120, which, as the name indicates, simply performs functions required to extend the transmission range. The optical extender apparatus is therefore much more compact, low energy demanding and easy to deploy than the radio units known in the prior art.

The wireless communications network 230 uses a minimum intermediate processing between the radio unit and the antenna elements. The network 230 may therefore distribute a signal among different small-cells, comprising the antenna elements of respective antenna groups, not reachable with a single remote radio unit of the type known in the prior art. low The cost digital optical links of this network 230 may overcome the copper distance limitation faced by prior art indoor small-cells.

The network 230 has centralised radio functions, i.e. the digital unit and the radio unit, which enables deployment flexibility and simplified operations and management control. The split radio unit structure of the network 230 may overcome the impairments typically faced by analogue RoF systems, such as cumulative effects of noise and device non-linearities.

The split radio unit structure of the network 230 may also enable the use of low cost optical transceivers, for example LED transceivers, giving a reduced optical bandwidth compared to full CPRI links.

Figure 13:
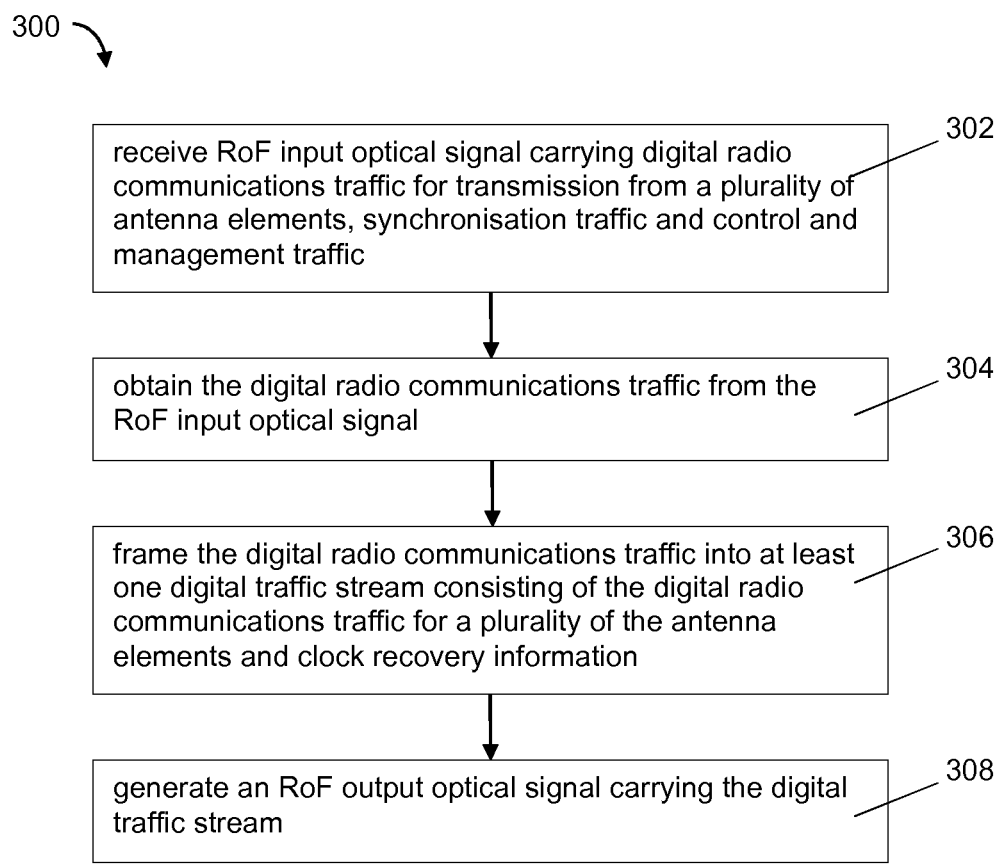
FIG. 13 shows the steps of a method according to a twelfth embodiment of the invention of transmitting communications traffic in a wireless communications network.

Referring to FIG. 13, a twelfth embodiment of the invention provides a method 300 of transmitting communications traffic in a wireless communications network.

The method 300 comprises the steps of:

a. receiving a radio over fibre, RoF, input optical signal carrying digital radio communications traffic for transmission from a plurality of antenna elements, synchronisation traffic and control and management traffic 302;

b. obtaining the digital radio communications traffic from the RoF input optical signal 304;

c. framing the digital radio communications traffic into at least one digital traffic stream consisting of the digital radio communications traffic for transmission from a plurality of the antenna elements and clock recovery information 306; and d. generating an RoF output optical signal carrying the digital traffic stream 308.

Figure 14:
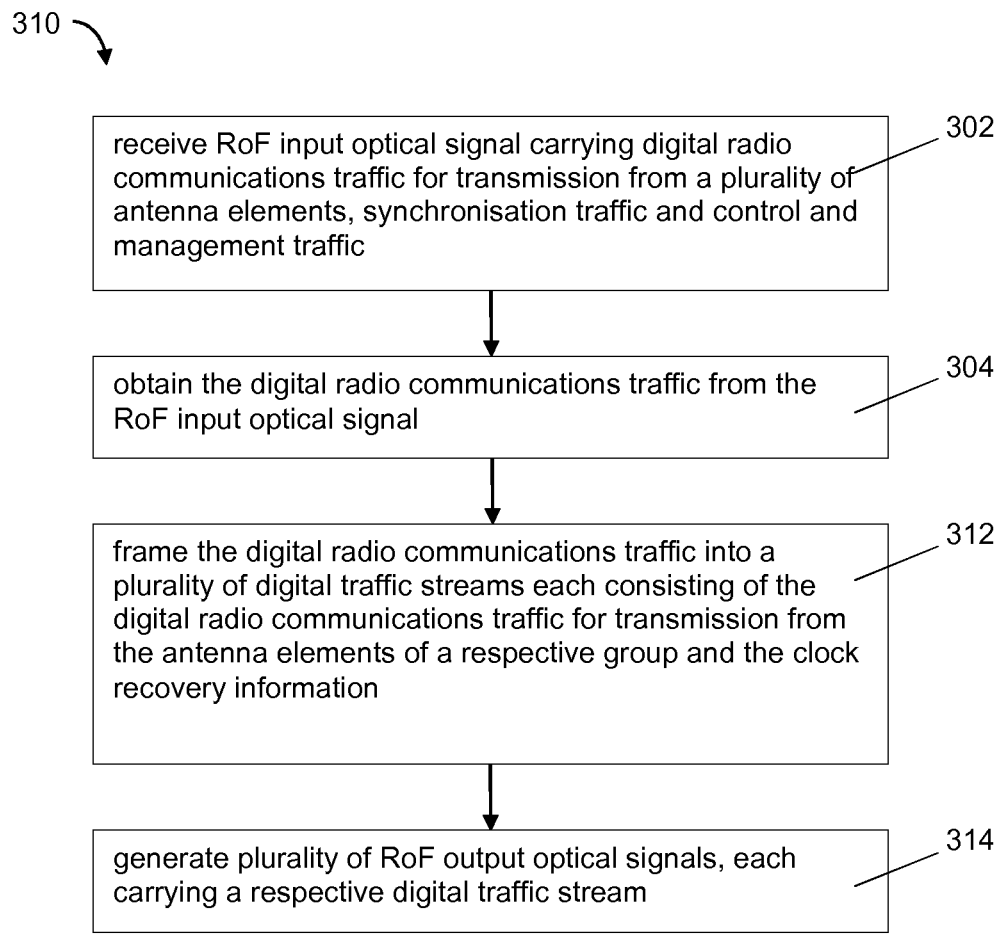
FIG. 14 shows the steps of a method according to a thirteenth embodiment of the invention of transmitting communications traffic in a wireless communications network.

A thirteenth embodiment of the invention provides a method 310 of transmitting communications traffic in a wireless communications network. The steps of the method 310 are shown in FIG. 14. The method of this embodiment is similar to the method 300 of the previous embodiment, with the following modifications.

The method of this embodiment is for use with a plurality of antenna elements which arranged in a plurality of antenna groups.

In step c. of this embodiment, the digital radio communications traffic is framed into a plurality of digital traffic streams each consisting of the digital radio communications traffic for transmission from the antenna elements of a respective group and the clock recovery information 312. In step d., a plurality of RoF output optical signals are generated, each carrying a respective digital traffic stream 314.

Figure 15:
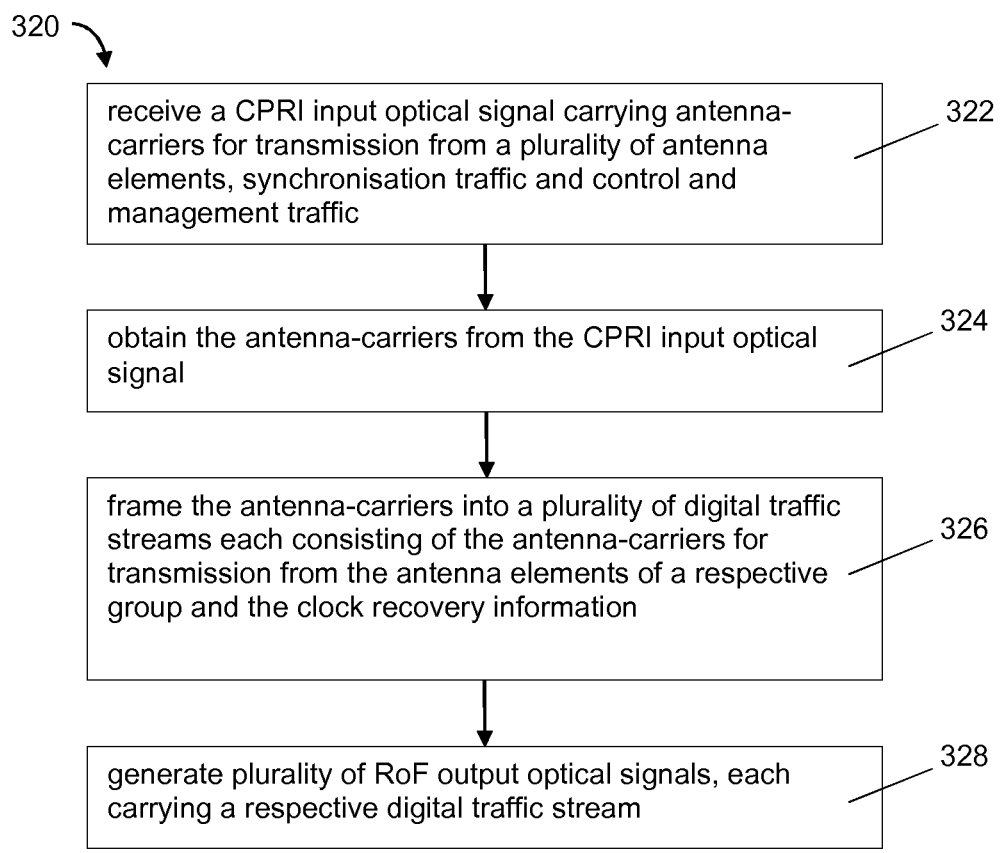
FIG. 15 shows the steps of a method according to a fourteenth embodiment of the invention of transmitting communications traffic in a wireless communications network.

A fourteenth embodiment of the invention provides a method 320 of transmitting communications traffic in a wireless communications network. The steps of the method are shown in FIG. 15.

The method 320 comprises the steps of:

a. receiving a CPRI input optical signal carrying antenna-carriers for transmission from a plurality of antenna elements, synchronisation traffic and control and management traffic 322;

b. obtaining the antenna-carriers from the RoF input optical signal 324;

c. framing the antenna-carriers into a plurality of digital traffic streams, each consisting of the antenna-carriers for transmission from the antenna elements of a respective antenna group and clock recovery information 326; and d. generating a plurality of RoF output optical signals, each carrying a respective digital traffic stream 328.

Figure 16:
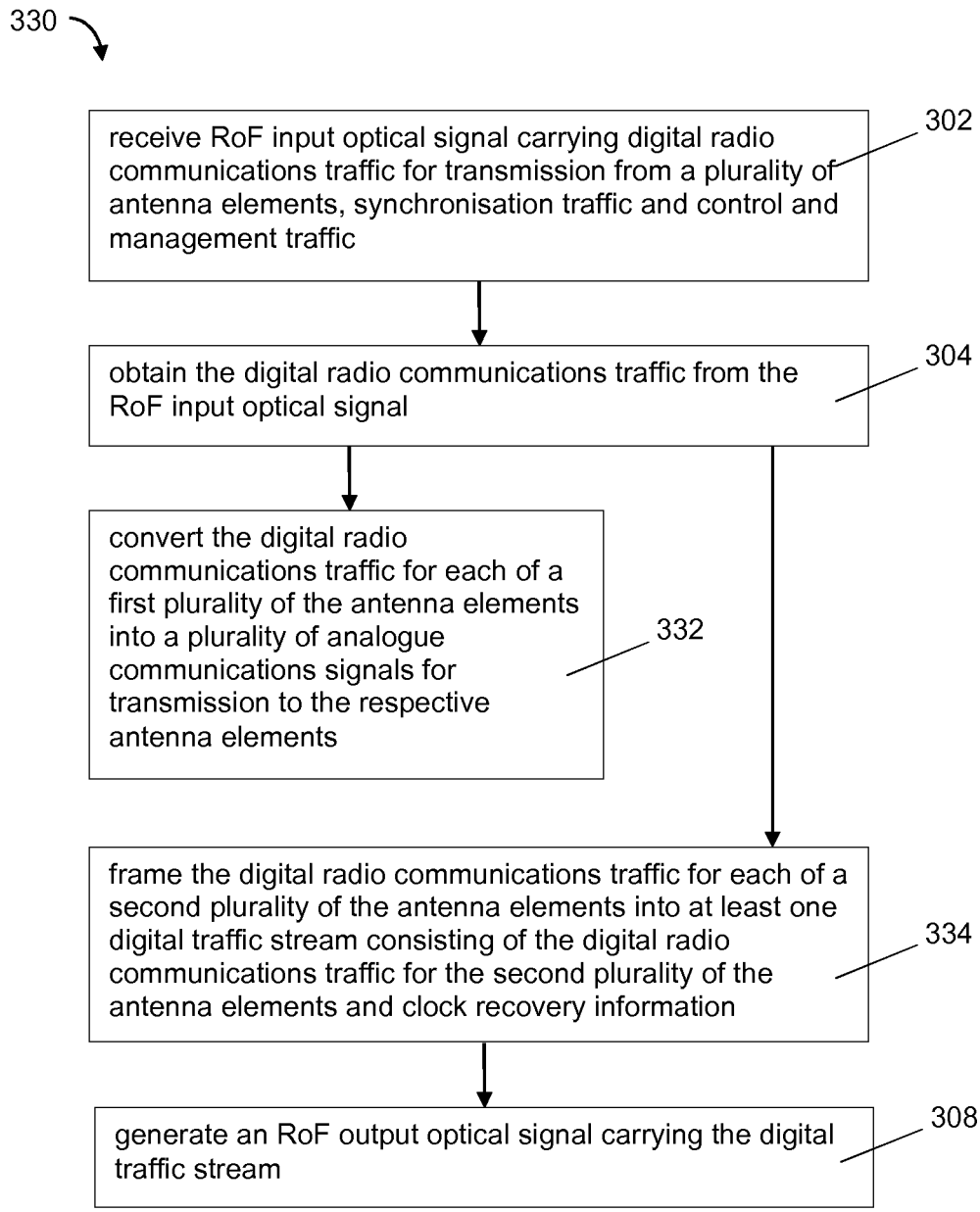
FIG. 16 shows the steps of a method according to a fifteenth embodiment of the invention of transmitting communications traffic in a wireless communications network.

A fifteenth embodiment of the invention provides a method 330 of transmitting communications traffic in a wireless communications network. The steps of the method are shown in FIG. 16. The method 330 of this embodiment is similar to the method 300 of the twelfth embodiment, with the following modifications.

The method of this embodiment is for use with two pluralities of antenna elements; a first plurality of antenna elements provided at a first location and a second plurality of antenna elements provided at at least one second location, remote from the first location.

Step b. further comprises converting the digital radio communications traffic for transmission from each of the first plurality of the antenna elements into a plurality of analogue communications signals. The analogue communications signals are for transmission to respective antenna elements of the first plurality of antenna elements 332. Step c. 334 and step d. 308 are performed on the digital radio communications traffic for transmission from the second plurality of antenna elements.

Figure 17:
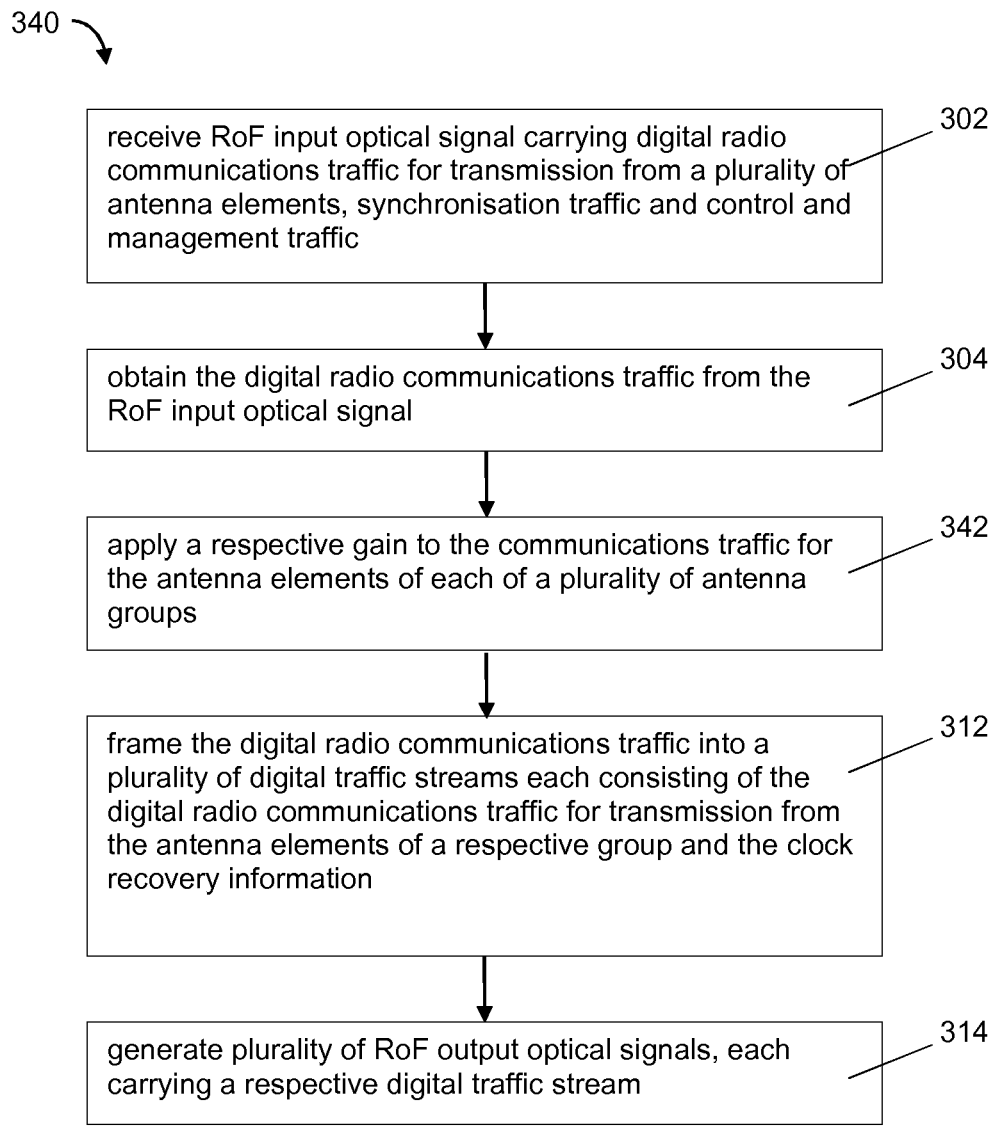
FIG. 17 shows the steps of a method according to a sixteenth embodiment of the invention of transmitting communications traffic in a wireless communications network.

A sixteenth embodiment of the invention provides a method 340 of transmitting communications traffic in a wireless communications network. The steps of the method are shown in FIG. 17. The method 340 of this embodiment is similar to the method 300 of the twelfth embodiment, with the following modifications.

The method of this embodiment further comprise, before framing, applying a respective gain to the digital radio communications traffic for transmission from the antenna elements of each antenna group 342.

Figure 18:
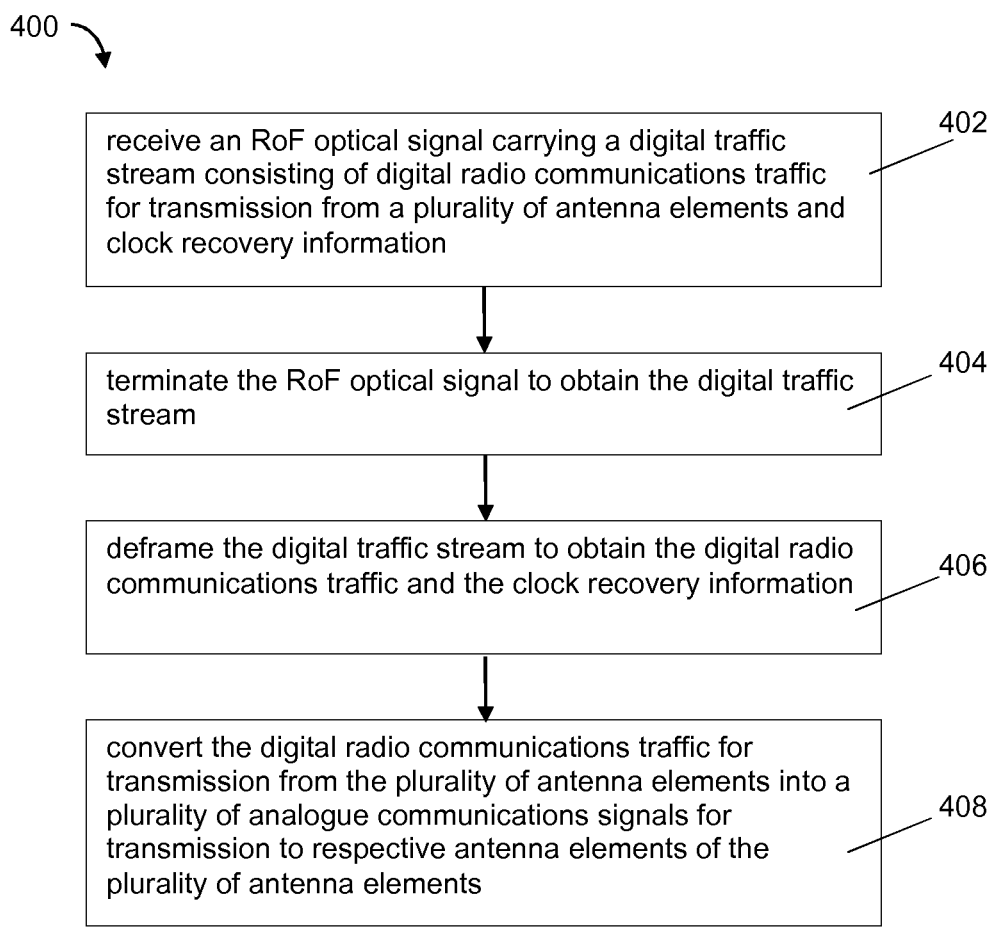
FIG. 18 shows the steps of a method according to a seventeenth embodiment of the invention of extending the transmission of communications traffic in a wireless communications network.

Referring to FIG. 18, a seventeenth embodiment of the invention provides a method 400 of extending the transmission of communications traffic in a wireless communications network.

The method 400 comprises the steps of:

i. receiving an RoF optical signal carrying a digital traffic stream consisting of digital radio communications traffic for transmission from a plurality of antenna elements and clock recovery information 402 and terminating the RoF optical signal to obtain the digital traffic stream 404;

ii. deframing the digital traffic stream to obtain the digital radio communications traffic and the clock recovery information 406; and iii. converting the digital radio communications traffic for transmission from the plurality of antenna elements into a plurality of analogue communications signals for transmission to respective antenna elements of the plurality of antenna elements 408.

Figure 19:
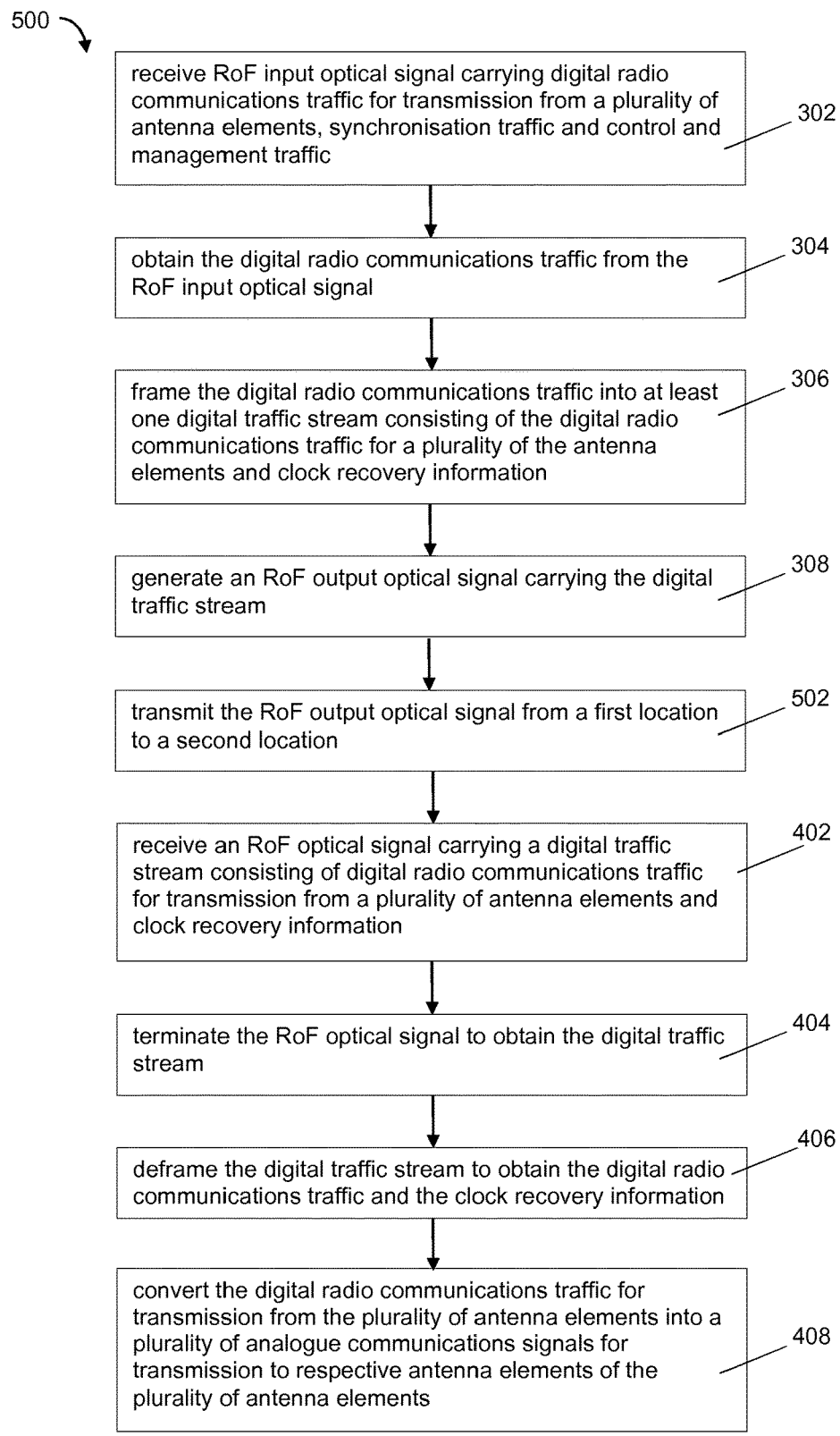
FIG. 19 shows the steps of a method according to an eighteenth embodiment of the invention of extended transmission of communications traffic in a wireless communications network.

Referring to FIG. 19, an eighteenth embodiment of the invention provides a method 500 of extended transmission in a wireless communication network.

In the method 500 of this embodiment, the steps of the method 300 according to the twelfth embodiment of the invention of transmitting communications traffic in a wireless communications network are performed at a first location. The RoF output optical signal is then transmitted from the first location to a second location, remote from the first location 502. At the second location, the steps of the method 400 according to the seventeenth embodiment of the invention of extending the transmission of communications traffic in a wireless communications network are performed.

It will be appreciated that any of the methods 310, 320, 330, 340 of transmitting communications traffic in a wireless communications network according to the thirteenth to sixteenth embodiments of the invention may alternatively be performed at the first location.

A nineteenth embodiment the invention provides a computer program, comprising instructions which, when executed on at least one processor, cause the at least one processor to carry out any of the steps described above of the method 300, 310, 320, 330, 340 of transmitting communications traffic in a wireless communications network.

An twentieth embodiment of the invention provides a computer program, comprising instructions which, when executed on at least one processor, cause the at least one processor to carry out any of the steps described above of the method 400 of extending the transmission of communications traffic in a wireless communications network.

A twenty-first embodiment of the invention provides a carrier containing a computer program as described above, wherein the carrier is one of an electronic signal, optical signal, radio signal, or computer readable storage medium.

The invention claimed is:

1. A wireless communications network radio unit comprising:

an input arranged to receive a radio over fibre, RoF, input optical signal carrying digital radio communications traffic for transmission from a plurality of antenna elements, synchronisation traffic and control and management traffic;

a digital receiver arranged to receive and terminate the RoF input optical signal to obtain the digital radio communications traffic;

a framer arranged to frame the digital radio communications traffic into at least one digital traffic stream consisting of the digital radio communications traffic for transmission from a plurality of the antenna elements and clock recovery information; and at least one optical transmitter arranged to generate an RoF output optical signal carrying the digital traffic stream.

2. The wireless communications network radio unit as claimed in claim 1, wherein:

the plurality of antenna elements are arranged in a plurality of antenna groups;

the framer is arranged to frame the digital radio communications traffic into a plurality of digital traffic streams each consisting of the digital radio communications traffic for transmission from the antenna elements of a respective group and the clock recovery information; and the radio unit comprises a plurality of optical transmitters each arranged to generate a respective RoF output optical signal carrying a respective digital traffic stream.

3. The wireless communications network radio unit as claimed in claim 1, wherein the RoF input optical signal is a common public radio interface, CPRI, signal and the digital radio communications traffic for transmission from the plurality of antenna elements comprises a plurality of antenna-carriers, and wherein each digital traffic stream consists of the antenna-carriers for respective antenna elements of the plurality of antenna elements and clock recovery information.

4. The wireless communications network radio unit as claimed in claim 1, further comprising an electrical routing apparatus and a digital to analogue converter, DAC, wherein the electrical routing apparatus is arranged to receive the digital radio communications traffic from the digital receiver and is arranged to route the digital radio communications traffic for transmission from each of a first plurality of the antenna elements to the DAC and to route the digital radio communications traffic for transmission from each of a second plurality of the antenna elements to the framer.

5. A wireless communications network comprising:

a digital baseband unit arranged to generate and transmit an RoF optical signal carrying digital radio communications traffic for transmission from a plurality of antenna elements, synchronisation traffic and control and management;

a wireless communications network radio unit as claimed in claim 1 and arranged to receive the RoF optical signal from the digital baseband unit;

a first optical link coupling the digital baseband unit to the radio unit;

an optical extender apparatus comprising:

an input arranged to receive an RoF optical signal carrying a digital traffic stream consisting of digital radio communications traffic for transmission from a plurality of antenna elements and clock recovery information;

an optical receiver arranged to receive and terminate the RoF optical signal to obtain the digital traffic stream;

a deframer arranged to deframe the digital traffic stream to obtain the digital radio communications traffic and the clock recovery information; and a digital to analogue converter arranged to receive the digital radio communications traffic and the clock recovery information and arranged to convert the digital radio communications traffic into a plurality of analogue communications signals for transmission to respective antenna elements;

a second optical link coupling the radio unit to the optical extender apparatus;

a plurality of antenna elements; and a plurality of electrical links each coupling the optical extender apparatus to a respective one of the antenna elements.

6. The wireless communications network radio unit as claimed in claim 2, further comprising a gain controller provided before the framer and arranged to apply a respective gain to the digital radio communications traffic for transmission from the antenna elements of each antenna group.

7. The wireless communications network radio unit as claimed in claim 3, wherein for each digital traffic stream the framer is arranged to frame the antenna-carriers and to apply at least one of a clock recovery overhead and coding for clock recovery.

8. The wireless communications network as claimed in claim 5, wherein:

the plurality of antenna elements are arranged in a plurality of antenna groups;

the radio unit framer is arranged to frame the digital radio communications traffic into a plurality of digital traffic streams each consisting of the digital radio communications traffic for transmission from the antenna elements of a respective group and the clock recovery information;

the radio unit comprises a plurality of optical transmitters each arranged to generate a respective RoF output optical signal carrying a respective digital traffic stream; and wherein the wireless communications network comprises a plurality of optical extender apparatuses, each arranged to receive a respective one of the RoF output optical signals from the radio unit, each said optical extender apparatus being coupled to the radio unit by a respective second optical link and being coupled to each antenna element of the respective group by a respective electrical link.

9. Optical extender apparatus comprising:

an input arranged to receive an RoF optical signal carrying a digital traffic stream consisting of digital radio communications traffic for transmission from a plurality of antenna elements and clock recovery information;

an optical receiver arranged to receive and terminate the RoF optical signal to obtain the digital traffic stream;

a deframer arranged to deframe the digital traffic stream to obtain the digital radio communications traffic and the clock recovery information; and a digital to analogue converter arranged to receive the digital radio communications traffic and the clock recovery information and arranged to convert the digital radio communications traffic into a plurality of analogue communications signals for transmission to respective antenna elements.

10. A method of transmitting communications traffic in a wireless communications network, the method comprising the steps of:

a. receiving a radio over fibre, RoF, input optical signal carrying digital radio communications traffic for transmission from a plurality of antenna elements, synchronisation traffic and control and management traffic;

b. obtaining the digital radio communications traffic from the RoF input optical signal;

c. framing the digital radio communications traffic into at least one digital traffic stream consisting of the digital radio communications traffic for transmission from a plurality of the antenna elements and clock recovery information; and d. generating an RoF output optical signal carrying the digital traffic stream.

11. The method as claimed in claim 10, wherein:

the plurality of antenna elements are arranged in a plurality of antenna groups;

in step c., the digital radio communications traffic is framed into a plurality of digital traffic streams each consisting of the digital radio communications traffic for transmission from the antenna elements of a respective group and the clock recovery information; and in step d., a plurality of RoF output optical signals are generated, each carrying a respective digital traffic stream.

12. The method as claimed in claim 10, wherein the RoF input optical signal is a common public radio interface, CPRI, signal and the digital radio communications traffic for transmission from the plurality of antenna elements comprises a plurality of antenna-carriers, and wherein each digital traffic stream consists of the antenna-carriers for respective antenna elements of the plurality of antenna elements and clock recovery information.

13. The method as claimed in claim 10, wherein step b. further comprises converting the digital radio communications traffic for transmission from each of a first plurality of the antenna elements into a plurality of analogue communications signals for transmission to respective antenna elements of the first plurality of antenna elements and the method set out in step c. and step d. is performed on the digital radio communications traffic for transmission from each of a second plurality of the antenna elements.

14. The method as claimed in claim 11, wherein step c. comprises, for each digital traffic stream, framing the antenna-carriers and applying at least one of a clock recovery overhead and coding for clock recovery.

15. The method as claimed in claim 11, further comprising, before framing, applying a respective gain to the digital radio communications traffic for transmission from the antenna elements of each antenna group.

16. A method of extending the transmission of communications traffic in a wireless communications network, the method comprising the steps of:

i. receiving an RoF optical signal carrying a digital traffic stream consisting of digital radio communications traffic for transmission from a plurality of antenna elements and clock recovery information and terminating the RoF optical signal to obtain the digital traffic stream;

ii. deframing the digital traffic stream to obtain the digital radio communications traffic and the clock recovery information; and iii. converting the digital radio communications traffic for transmission from the plurality of antenna elements into a plurality of analogue communications signals for transmission to respective antenna elements of the plurality of antenna elements.

* * * * *